United States Patent [19]

Rittle et al.

[11] Patent Number: 5,598,495
[45] Date of Patent: Jan. 28, 1997

[54] FIBER OPTIC CONNECTOR HOUSING, FIBER OPTIC RECEPTACLE, ACCESSORIES EMPLOYING FIBER OPTIC CONNECTOR HOUSINGS AND CORRESPONDING OPTICAL ASSEMBLIES

[75] Inventors: Jeffrey W. Rittle, Endicott; William W. Vetter, Vestal; James R. Webb, Endicott, all of N.Y.

[73] Assignee: International Business Machines Corporation, Armonk, N.Y.

[21] Appl. No.: 439,029

[22] Filed: May 11, 1995

Related U.S. Application Data

[62] Division of Ser. No. 975,770, Nov. 13, 1992, Pat. No. 5,325,454.

[51] Int. Cl.[6] ............................... G02B 6/00; G02B 6/36
[52] U.S. Cl. ............................... 385/75; 385/76
[58] Field of Search ...................... 385/76, 77, 88, 385/89, 90, 53, 55, 56, 58, 59, 70, 71, 72, 75

[56] References Cited

U.S. PATENT DOCUMENTS

| | | | |
|---|---|---|---|
| 4,687,291 | 8/1987 | Stape et al. | 385/59 |
| 4,779,952 | 10/1988 | Hayashi et al. | 385/66 |
| 4,798,440 | 1/1989 | Hoffer et al. | 385/89 |
| 4,953,929 | 9/1990 | Basista et al. | 385/55 |
| 5,076,656 | 12/1991 | Briggs et al. | 385/71 |
| 5,134,679 | 7/1992 | Robin et al. | 385/90 |
| 5,138,679 | 8/1992 | Edwards et al. | 385/90 |
| 5,138,680 | 8/1991 | Briggs et al. | 385/90 |
| 5,140,663 | 8/1992 | Edwards et al. | 385/89 |
| 5,325,454 | 6/1994 | Rittle et al. | 385/76 |

*Primary Examiner*—Akm E. Ullah
*Attorney, Agent, or Firm*—Bernard Tiegerman

[57] ABSTRACT

A new fiber optic connector housing and a new fiber optic receptacle, both of which conform to a new standard proposed by the X3T9.3 committee of the American National Standards Institute, are disclosed. In addition, four accessory devices for electro-optic modules, each of which includes one or more essentially conventional plug frames which fit into either one or more conventional, individual fiber optic connector housings or the new fiber optic connector housing, are disclosed.

11 Claims, 18 Drawing Sheets

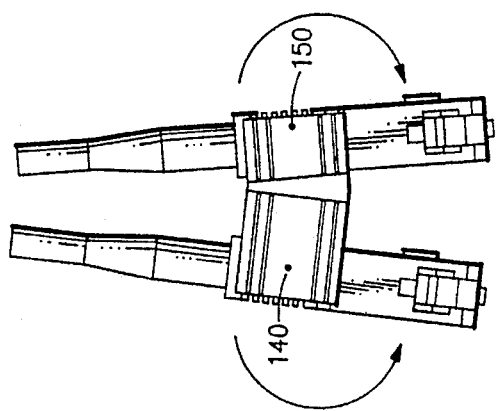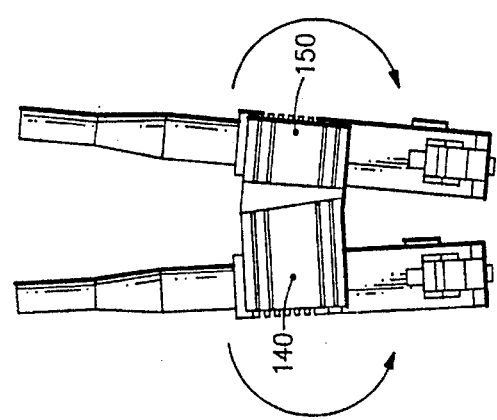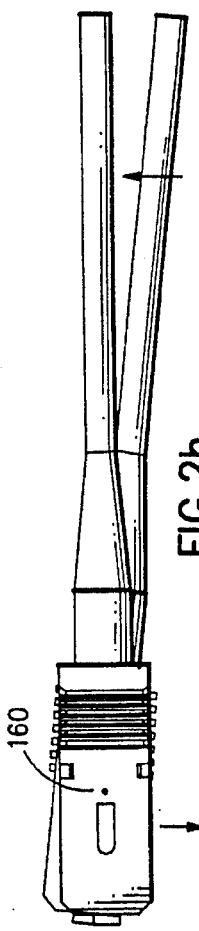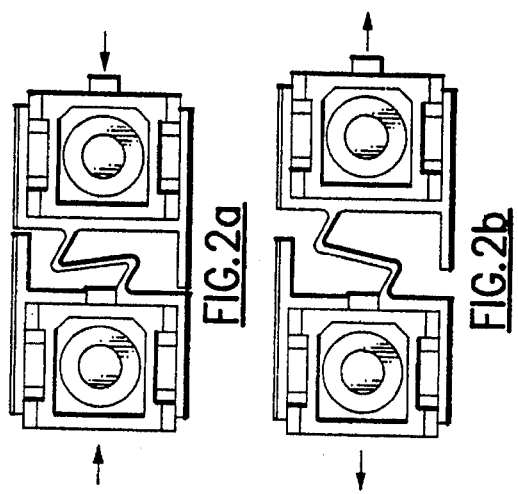

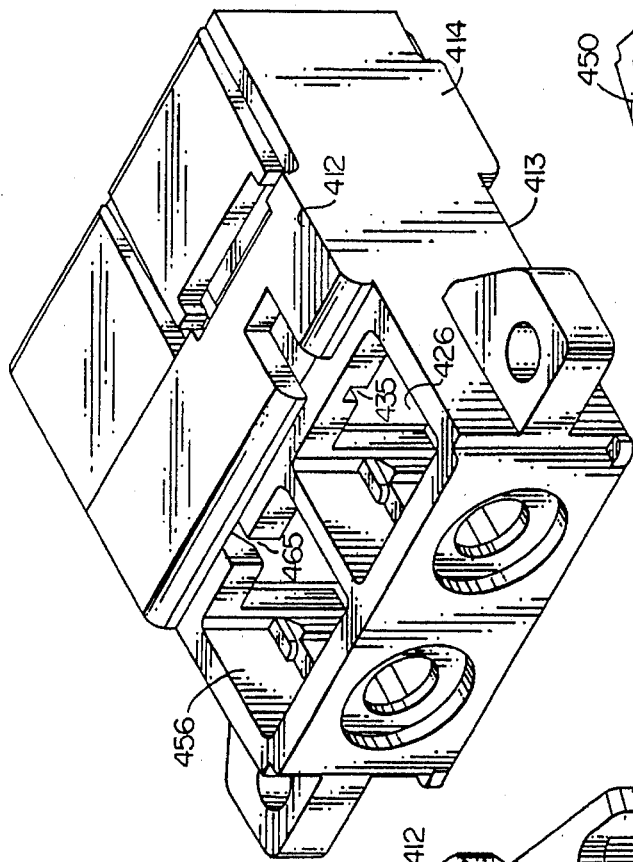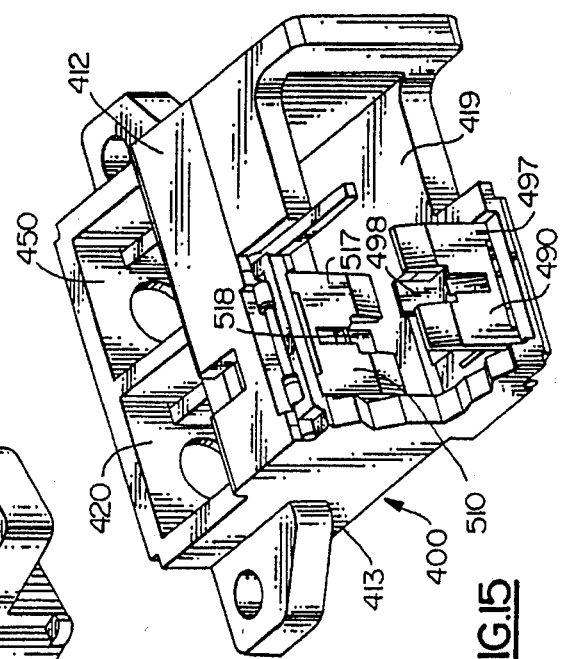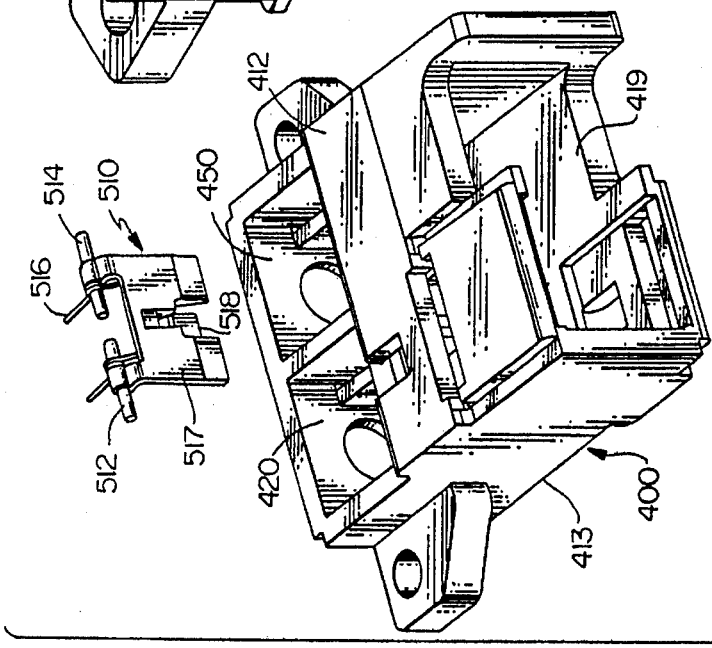

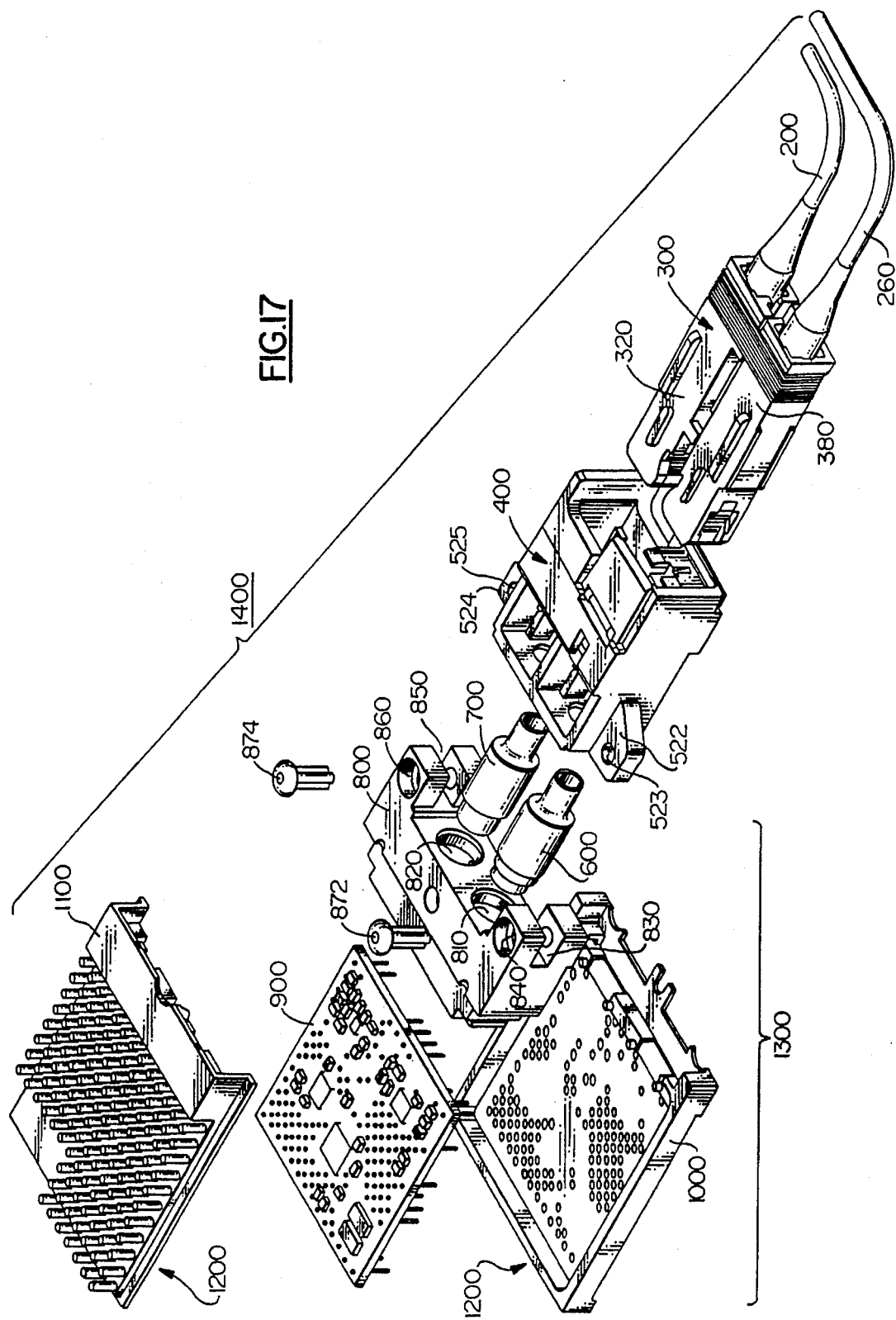

5,598,495

FIBER OPTIC CONNECTOR HOUSING, FIBER OPTIC RECEPTACLE, ACCESSORIES EMPLOYING FIBER OPTIC CONNECTOR HOUSINGS AND CORRESPONDING OPTICAL ASSEMBLIES

This is a divisional of application Ser. No. 07/975,770 filed on Nov. 13, 1992, now U.S. Pat. No. 5,325,454.

BACKGROUND OF THE INVENTION

1. Field of the Invention

The invention pertains generally to fiber optics, and more particularly to a fiber optic connector housing, a fiber optic receptacle, various accessories for electro-optic modules which include fiber optic connector housings and corresponding optical assemblies.

2. Description of the Related Art

Those engaged in the manufacture and use of communication systems, e.g., systems for communicating voice, video and/or data, have become increasingly interested in using fiber optic cables as transmission media in such systems. This interest is stimulated by the fact that the potential bandwidth. (or information-carrying capacity) of optical fibers is extremely high. In addition, communication systems employing fiber optic cables are resistant to electromagnetic interference, which sometimes plagues systems employing electrical cables as transmission media. Moreover, communication systems employing fiber optic cables are considered more secure than systems employing electrical cables because it is generally more difficult for unauthorized personnel to tap or access a fiber optic cable without being detected.

An exemplary communication system employing a fiber optic cable as a transmission medium is one which includes, for example, two or more computers, e.g., mini-computers, with each adjacent pair of mini-computers being interconnected by a fiber optic cable which includes two optical fibers, i.e., a transmit optical fiber and a receive optical fiber. Obviously, each mini-computer generates and receives information, i.e., data, in electrical form. Consequently, each mini-computer is also provided with an electro-optic module, typically mounted on a printed circuit board or printed circuit card of the mini-computer, which converts the electrical signals generated by the mini-computer into optical signals, which are transmitted to the adjacent mini-computer via the transmit optical fiber. In addition, the electro-optic module converts optical signals communicated to the mini-computer via the receive optical fiber into corresponding electrical signals.

An electro-optic module 10, typical of the type referred to above, is depicted in FIG. 1 and includes a housing 20 containing a transmitter optical subassembly (TOSA) 30 (not shown), a receiver optical subassembly (ROSA) 40 (not shown) and a pinned ceramic substrate 50 (not shown) bearing a number of semiconductor integrated circuit devices, with the pins 55 of the ceramic substrate protruding from the housing 10. The TOSA 30, which is electrically connected to certain of the semiconductor integrated circuit devices (hereinafter denoted the TOSA ICs), includes an electro-optic transducer, such as a semiconductor laser, which serves to convert electrical signals generated by the TOSA ICs into corresponding optical signals. The TOSA 30 also includes a lens (not shown) and a hollow cylinder (for the sake of convenience, hereinafter termed a bore) 35, which bore protrudes from the housing 10, with the lens serving to focus the light produced by the semiconductor laser onto the end of a transmit optical fiber which is to be inserted into the bore 35. Similarly, the ROSA 40, which is also connected to certain of the semiconductor integrated circuit devices (hereinafter denoted the ROSA ICs), includes an electro-optic transducer, such as a PIN photodiode, which serves to convert optical signals received by the photodiode into corresponding electrical signals, which are communicated to the ROSA ICs. The ROSA 40 also includes a bore (hollow cylinder) 45, which protrudes from the housing 10, into which a receive optical fiber is to be inserted, the receive optical fiber serving to communicate optical signals to the PIN photodiode.

The transmit and receive optical fibers, referred to above, are depicted in FIG. 1 and are denoted, respectively, by the numbers 60 and 70. As is conventional, and as shown in FIG. 1, each of these optical fibers is encased in one or more protective plastic sheaths, and each of these optical fibers extends into a ferrule (not shown). To prevent optical losses, it is important that the ferrule containing the transmit optical fiber 60 be inserted into the bore 35 so as to bring the transmit optical fiber into precise alignment with the semiconductor laser and corresponding lens of the TOSA 30. Similarly, it is important that the ferrule containing the receive optical fiber 70 be inserted into the bore 45 so as to bring the receive optical fiber into precise alignment with the PIN photodiode of the ROSA 40. If, for example, the transmit and receive optical fibers are single mode fibers, then the accuracy of each of these alignments must typically be to within one micrometer or less.

One set of devices which permits the achievement of micrometer-accurate alignment is also depicted in FIG. 1. That is, as shown in FIG. 1, such alignment accuracy is achievable by inserting the ferrule containing the transmit optical fiber 60 into a plug frame (not shown) which, in turn, is inserted into an individual fiber optic connector housing (FOCH) 80. Similarly, the ferrule containing the receive optical fiber 70 is inserted into a plug frame (not shown) which, in turn, is also inserted into an individual FOCH 90. As also shown in FIG. 1, each of the individual FOCHs is, for example, of the so-called push-pull type available from NTT (Nippon Telegraph and Telephone Corporation, Tokyo, Japan) and referred to as SC-01 straight plug connector. As depicted, each such SC-01 connector is hollow and generally rectangular in cross-section and has length, width and height dimensions of, respectively, 1.000 inches (25.4 mm), 0.356 inches (9.05 mm) and 0.293 inches (7.45 mm). Each such SC-01 connector is also to be inserted into a common receptacle housing (described below), which serves as the mechanism for achieving the above-described alignment. To achieve proper orientation of the individual FOCHs relative to this common receptacle housing, the individual FOCH 80 includes a key 82 on a side surface, and the individual FOCH 90 includes a key 92 on a side surface, which keys are to be received in corresponding keyways in the common receptacle housing. In addition, for reasons explained below, the front end of the individual FOCH 80 includes symmetrical, inclined surfaces 84 and 85, and the top and bottom surfaces of the FOCH 80 include symmetrical apertures 86 (shown) and 87 (not shown). Similarly, the front end of the individual FOCH 90 includes symmetrical, inclined surfaces 94 and 95, and the top and bottom surfaces of the individual FOCH 90 include symmetrical apertures 96 (shown) and 97 (not shown). As explained below, it has been believed that the symmetries associated with these inclined surfaces and apertures are essential to achieving alignment accuracies of one micrometer or less.

To take into account manufacturing tolerances associated with the common receptacle housing and/or the individual FOCHs 80 and 90, while still assuring successful insertion of the individual FOCHs into the common receptacle housing, the devices depicted in FIG. 1 also include a separate adapter 100 of the type disclosed in U.S. Pat. No. 4,953,929, which is hereby incorporated by reference. This adapter 100, when connected to the individual FOCHs 80 and 90, permits successful insertion to be achieved while taking account of manufacturing tolerances because the adapter serves to maintain the individual FOCHs in a substantially side-by-side relationship while permitting the individual FOCHs to move relative to one another in at least four different directions. That is, as shown in FIG. 1, the adapter 100 includes a generally C-shaped clamp member 110, which is adapted to clamp onto individual FOCH 80, and a generally C-shaped clamp member 120, which is adapted to clamp onto individual FOCH 90. Each such clamp member includes tabs 105 intended to engage corresponding slots or openings in the individual FOCHs. In addition, the adapter 100 also includes a generally S-shaped flexible member 130 which extends between the clamp members 110 and 120. It is the clamp members 110 and 120 which serve to maintain the individual FOCHs in a substantially side-by-side relationship. On the other hand, it is the generally S-shaped flexible member 130 which permits the individual FOCHs to move relative to one another in at least four different directions.

The relative motions permitted by the generally S-shaped flexible member 130 are depicted in FIGS. 2a through 2h, with the arrows in these figures indicating the directions of the motions. For example, as depicted in FIGS. 2a and 2b, the flexible member 130 permits the individual FOCHs to be moved compressively and expansively toward and away from each other. In addition, as depicted in FIGS. 2c and 2d, the flexible member 130 permits each individual FOCH to be moved up or down relative to the other FOCH. Further, as depicted in FIGS. 2e and 2f, the flexible member 130 permits the individual FOCHs to be pivoted, relative to each other, about parallel axes 140 and 150, which are perpendicular to the plane of the paper containing FIGS. 2e and 2f. Moreover, as depicted in FIGS. 2g and 2h, the flexible member 130 permits each individual FOCH to be pivoted, relative to the other FOCH, about an axis 160 which extends between the individual FOCHs and is perpendicular to the axes 140 and 150.

It should be noted that all parts of the adapter 100 are conventionally of identical thickness which is, for example, 0.030 inches (0.76 mm). In addition, the width of each of the clamp members 110 and 120 is conventionally identical and is, for example, 0.276 inches (7.00 mm), while the height of each of the clamp members 110 and 120 is conventionally identical and is, for example, 0.356 inches (9.05 mm). Further, the width of the flexible member 130 is, for example, 0.142 inches (3.60 mm). Consequently, when the clamp members 110 and 120 are clamped onto the individual FOCHs 80 and 90, and if one takes into account the thicknesses of the vertical side walls of the clamp members and the width of the generally S-shaped flexible member 130, then it follows that the center-to-center spacing between the FOCHs, and therefore the center-to-center spacing between the ferrules contained in the FOCHs, is 0.5 inches (12.7 mm).

The common receptacle housing, referred to above, is depicted in FIG. 1 and denoted by the number 140. This receptacle housing is generally rectangular in outline and includes two longitudinally extending apertures 150 and 160, which are generally rectangular in cross-section and dimensioned to receive the individual FOCHs 80 and 90. In addition, the aperture 150 includes a keyway 155 adapted to receive the key 82 of the individual FOCH 80, while the aperture 160 includes a keyway 165 adapted to receive the key 92 of the individual FOCH 90.

As also shown in FIG. 1, a first pair of clips 170, interconnected by a wall 177, is provided for insertion into the rear of aperture 150, while a second pair of clips 180, interconnected by a wall 187, is provided for insertion into the rear of aperture 160. The longitudinal extent of the first and second pairs of clips 170 and 180 in the apertures 150 and 160 is chosen in relation to the lengths of the keyways 155 and 165 so that the keyways extend fully to the front ends of the first and second pairs of clips. In addition, the first pair of clips 170 includes symmetrical, inclined camming surfaces 174 and 175 which are adapted to engage the symmetrical, inclined surfaces 84 and 85, as well as the symmetrical apertures 86 and 87, of FOCH 80. Similarly, the second pair of clips 180 includes symmetrical, inclined camming surfaces 184 and 185 which are adapted to engage the symmetrical, inclined surfaces 94 and 95, as well as the symmetrical apertures 96 and 97, of FOCH 90.

As is evident from FIG. 1, the wall 177, interconnecting the first pair of clips 170, includes an aperture 178, centrally located between the clips 170, which is adapted to receive bore 35. Similarly, the wall 187, interconnecting the second pair of clips 180, includes an aperture 188, centrally located between the clips 180, which is adapted to receive bore 45.

When assembled, the above-described elements permit the ferrules containing the optical fibers 60 and 70 to extend into the bores 35 and 45 and to be properly aligned to within micrometer tolerances. That is, in the course of assembly, the adapter 100 is used to interconnect the individual FOCHs 80 and 90 by applying the clamp member 110 to the FOCH 80 and the clamp member 120 to the FOCH 90. In addition, the first and second pairs of clips 170 and 180 are inserted into the rear ends of the longitudinally extending apertures 150 and 160 of the receptacle housing 140, and the bores 35 and 45 are then inserted into the centrally located apertures 178 and 188 of the first and second pairs of clips. The front ends of the interconnected FOCHs 80 and 90 are then inserted into the front ends of the longitudinally extending apertures 150 and 160, with the key 82 entering the keyway 155 and the key 92 entering the keyway 165. These keyways 155 and 165, which extend all the way to the first and second pairs of clips 170 and 180, serve to guide the FOCHs 80 and 90 to these pairs of clips and have been believed to be essential to achieving micrometer-accurate alignment.

When the front ends of the FOCHs 80 and 90 contact the first and second pairs of clips 170 and 180, the symmetrically inclined camming surfaces 174 and 175 of the first pair of clips 170 engage the symmetrically inclined surfaces 84 and 85 of the FOCH 80, and the symmetrically inclined camming surfaces 184 and 185 of the second pair of clips 180 engage the symmetrically inclined surfaces 94 and 95 of the FOCH 90. As the FOCHs 80 and 90 are inserted more deeply into the apertures 150 and 160, the camming action effected by the camming surfaces serves to align the FOCHs 80 and 90, and therefore the ferrules contained in these FOCHs, relative to the bores 35 and 45 even as the ferrules enter these bores. As insertion continues, the clips 170 come to extend into the symmetrical apertures 86 and 87 of the FOCH 80 to thereby engage, and grip, the underlying plug frame, while the clips 180 come to extend into the symmetrical apertures 96 and 97 of the FOCH 90 to thereby also engage, and grip, the underlying plug frame. As a consequence, these plug frames and corresponding transmit and receive optical fibers are maintained in proper alignment relative to the bores 35 and 45 and to the corresponding semiconductor laser/lens combination and PIN photodiode associated with, respectively, the TOSA 30 and ROSA 40.

It must be emphasized that it has been believed that the above-described assembly procedure achieves micrometer-accurate alignment because the keyways 155 and 165, which extend all the way to the clips 170 and 180, serve to maintain the FOCHs in proper alignment relative to the clips up until the moment the clips engage the FOCHs, and that only such keyways are capable of achieving such alignment. In addition, it has also been believed that micrometer-accurate alignment is achieved because the forces exerted by the clips 170 and 180 on the FOCHs during the insertion procedure are symmetrical, and that such symmetrical forces can only be achieved by employing FOCHs having symmetrically inclined surfaces and apertures. Moreover, it has been believed that any deviation from such symmetrically inclined surfaces and apertures will necessarily lead to asymmetrical forces being exerted on the FOCHs, leading to unacceptably large misalignments between the transmit and receive optical fibers and, respectively, the semiconductor laser/lens combination and PIN photodiode.

It should be noted that the assembly procedure, described above, is relatively complex and adds substantially to the cost of the resulting optical assembly, and that there has long been a desire to reduce this cost.

Significantly, a number of new communication systems employing fiber optic links have been proposed. One such system, depicted in FIG. 3, serves to connect a plurality of devices in a so-called star network, using fiber optic links. As shown in FIG. 3, these devices include, for example, a direct access storage device (DASD), which includes one or more hard disks. These devices also include, for example, a printer and central processing units (CPUs) contained in, for example, personal computers or engineering work stations. In addition, these devices include, for example, a number of end stations, such as computer terminals, and a terminal concentrator, which allows the computer terminals to communicate with the CPUs in the star network.

Yet another proposed communication system employing fiber optic links is depicted in FIG. 4. In this system, a number of devices are connected to each other, via fiber optic links, through a central optical switch. This system includes, for example, CPUs, a DASD, computer terminals, and a shared memory, consisting of semiconductor memory. In addition, and as depicted in FIG. 4, this system could also include one or more telephone systems.

A number of standards have been proposed in connection with the communication systems depicted in FIGS. 3 and 4 and described above. For example, the personal computers and/or engineering work stations containing the CPUs mentioned above conventionally have brackets which hold printed circuit cards. Each such bracket also includes an opening or slot which permits the insertion of an input/output cable, such as an electrical cable or a fiber optic cable. If such a personal computer or engineering work station were to be included in one of the communication systems, described above, then this personal computer or engineering work station would have to include an electro-optic module and, for example, a common receptacle housing, of the type described above, mounted on a printed circuit card of the personal computer or engineering work station. A fiber optic connector housing which included, for example, two individual FOCHs 80 and 90 connected by an adapter 100, which individual FOCHs contain transmit and receive optical fibers, would then have to fit into the relevant slot in order to insert the fiber optic connector housing into the common receptacle housing, and thereby connect the corresponding fiber optic cable to the electro-optic module. However, to achieve consistency with other existing standards, a new standard has been proposed by the X3T9.3 committee of the American National Standards Institute (ANSI), which may also be adopted by the International Electrotechnical Commission (IEC), requiring the slot to be 0.293 inches (7.45 mm) high and 0.856 inches (21.75 mm) wide. Moreover, this new proposed standard also requires the center-to-center spacing between the ferrules, and therefore the center-to-center spacing between the individual FOCHs, to be 0.5 inches (12.7 mm). However, while an adapter 100 in combination with two individual FOCHs 80 and 90 can achieve a center-to-center spacing of 0.5 inches, the height of, for example, NTT SC-01 FOCHs is conventionally 0.356 inches (9.05 mm), which is greater than the the height of the slot specified in the proposed standard. As a consequence, such a combination could not be inserted into such a slot. If, on the other hand, the individual FOCHs were to be rotated by ninety degrees, so that the height and width of the individual FOCHs were to be interchanged, and if the adapter 100 were to be manufactured so that the height and width of the adapter were to be interchanged without reducing the width of the flexible member, then a combination of such an adapter and two such individual FOCHs would fit into the slot defined by the proposed standard. Unfortunately, by virtue of the thicknesses of the side walls of the clamp members 110 and 120 of such an altered adapter 100, the center-to-center spacing between the individual FOCHs would be 0,563 inches (14.3 mm), which violates the center-to-center spacing of 0.5 inches required by the proposed standard. It should also be noted that reducing the width of the flexible member, to achieve a center-to-center spacing of 0.5 inches, is not a viable option because any such width reduction significantly degrades the flexibility, and therefore functionality, of the flexible member.

Thus, those engaged in the development of fiber optics have sought, thus far without success, combinations of individual FOCHs and corresponding adapters, and combinations of common receptacle housings and pairs of clips, which require less assembly, and therefore lead to corresponding optical assemblies which are less costly. In addition, those engaged in the development of fiber optics have sought, thus far without success, combinations of at least two individual FOCHs and corresponding adapters which meet the height, width and center-to-center spacing requirements specified in the proposed ANSI standard, discussed above.

SUMMARY OF THE INVENTION

The invention involves a fiber optic connector housing which includes at least two individual FOCHs connected by at least one flexible member which maintains the individual FOCHs in a substantially side-by-side relationship while permitting each individual FOCH to move in at least four different directions relative to the other individual FOCH. Preferably, each of the individual FOCHs is of the push-pull type available from NTT and referred to as an SC-01 straight plug connector. However, the orientation of each of these individual FOCHs is preferably rotated by ninety degrees relative to the orientation depicted in FIG. 1, so that two of the four symmetrical apertures associated with the individual FOCHs face each other and the height and width dimensions of the individual FOCHs are thereby interchanged.

Significantly, the individual FOCHs and the at least one flexible member of the inventive fiber optic connector housing are of integral construction, which eliminates the need for assembly of these individual FOCHs and at least one flexible member. Moreover, this integral construction eliminates the need for clamp members between the individual FOCHs and at least one flexible member, i.e., the at least one flexible member extends directly from one individual FOCH to the other individual FOCH. Consequently, the inventive fiber optic connector housing is readily fabricated to achieve a center-to-center spacing between the individual FOCHs equal to, for example, 0.5 inches (12.7 mm), without reducing the standard width of the at least one flexible member, while simultaneously achieving a height and total width of, for example, 0.293 inches (7.45 mm) and 0.856 inches (21.75 mm), which conforms to the proposed ANSI standard, discussed above.

The inventive, integral fiber optic connector housing is preferably fabricated using conventional molding techniques, and is preferably of plastic. Significantly, at the completion of the molding process, to separate several parts of the (conventional) mold from the inventive, integral fiber optic connector housing without breaking the housing, it has been found necessary to introduce notches into the two sidewalls of the individual FOCHs which face each other. These notches, which have their counterparts in the mold used to form the inventive fiber optic connector housing, are preferably introduced into the very areas of the sidewalls containing the two facing, symmetrical apertures, thereby introducing asymmetries into the two apertures. However, and contrary to previously held beliefs, the presence of these particular asymmetries does not result in asymmetric forces being exerted on these individual FOCHs during the insertion of the inventive fiber optic connector housing into, for example, the inventive receptacle housing, described below, and the inventive fiber optic connector housing readily achieves alignment accuracies of one micrometer or less.

The invention also involves a fiber optic receptacle which includes a receptacle housing and at least one, and preferably two, pairs of clips extending from a rear wall of the receptacle housing. To conform to the orientation of the individual FOCHs of the inventive fiber optic connector housing, the orientation of the (preferably) two pairs of clips is rotated by ninety degrees relative to that of the two pairs of clips shown in FIG. 1. In addition, (preferably) two apertures are provided in the rear wall of the receptacle housing, each centrally positioned in relation to one of the two pairs of clips, for receiving the two bores of an electro-optic module.

As with the inventive fiber optic connector housing, the receptacle housing and (preferably) two pairs of clips of the inventive fiber optic receptacle are also of integral construction, which eliminates the need for assembly of this receptacle housing and two pairs of clips. In addition, the inventive fiber optic receptacle is readily dimensioned to receive the inventive fiber optic connector housing, when dimensioned in accordance with the proposed ANSI standard, thereby also conforming to this proposed standard.

The inventive, integral fiber optic receptacle is preferably also fabricated using conventional molding techniques, and is preferably also of plastic. As with the molding process used to fabricate the inventive fiber optic connector housing, at the completion of the molding process used to fabricate the inventive fiber optic receptacle, to separate several parts of the corresponding (conventional) mold from the inventive receptacle housing without breaking the housing, it has been found necessary to introduce openings into the walls of the inventive fiber optic receptacle located below and above the (preferably) two pairs of clips. These openings, which have their counterparts in the corresponding mold, extend longitudinally from the rear end of the inventive fiber optic receptacle, where the two bores of an electro-optic module are to be received, toward the front end of the inventive fiber optic receptacle, where the inventive fiber optic connector housing is to be received. In addition, the longitudinal extent of these openings is greater than that of the (preferably) two pairs of clips. Moreover, the walls containing these Openings also contain keyways adapted to receive corresponding keys on the individual FOCHs of the inventive fiber optic connector housing. Consequently, these keyways do not extend all the way to the (preferably) two pairs of clips. However, the longitudinal spacing between the front end of each pair of clips and the adjacent rear end of the corresponding keyway is preferably no greater than the longitudinal extent of the front end of the individual FOCH to be engaged by the clips, containing the symmetrical, inclined surfaces to be engaged by the symmetrical camming surfaces of the clips. Provided this longitudinal spacing requirement is met, and contrary to previously held beliefs, the above-described keyways are effective in properly aligning the individual FOCHs of, for example, the inventive fiber optic connector housing relative to the bores at the rear end of the inventive fiber optic receptacle, and in enabling the corresponding transmit and receive optical fibers to achieve micrometer-accurate alignment.

The invention further involves two devices for cleaning the lenses in the bores of electro-optic modules, a device for communicating the light produced by a first optical subassembly of an electro-optic module to a second optical subassembly of the same electro-optic module, as well as a shipping/storage plug for one or more optical subassemblies of an electro-optic module. Significantly, each of these devices includes components which fit into one or more plug frames adapted to receive the components, and each plug frame fits into an unmodified, individual FOCH. If the device involves the use of, for example, two plug frames, then the two plug frames are preferably inserted into the inventive fiber optic connector housing.

When using any of the four devices, described above, the corresponding individual FOCH (or individual FOCHs) is (are) inserted into either a conventional fiber optic receptacle, or the inventive fiber optic receptacle, mounted on the electro-optic module of interest. The corresponding device function is then readily performed, e.g., the lenses in the bores of the electro-optic module are cleaned, without the need for removing the fiber optic receptacle or disassembling the electro-optic module.

BRIEF DESCRIPTION OF THE DRAWING(S)

The invention is described with reference to the accompanying drawings, wherein:

FIG. 1 is an exploded, perspective view of an optical assembly which includes a conventional electro-optic module, a conventional fiber optic receptacle and two conventional, individual FOCHs connected by a known adapter;

FIG. 2(a)–2(h) depicts the motions of the individual FOCHs of FIG. 1 relative to each other, permitted by the adapter of FIG. 1;

Figure 11:
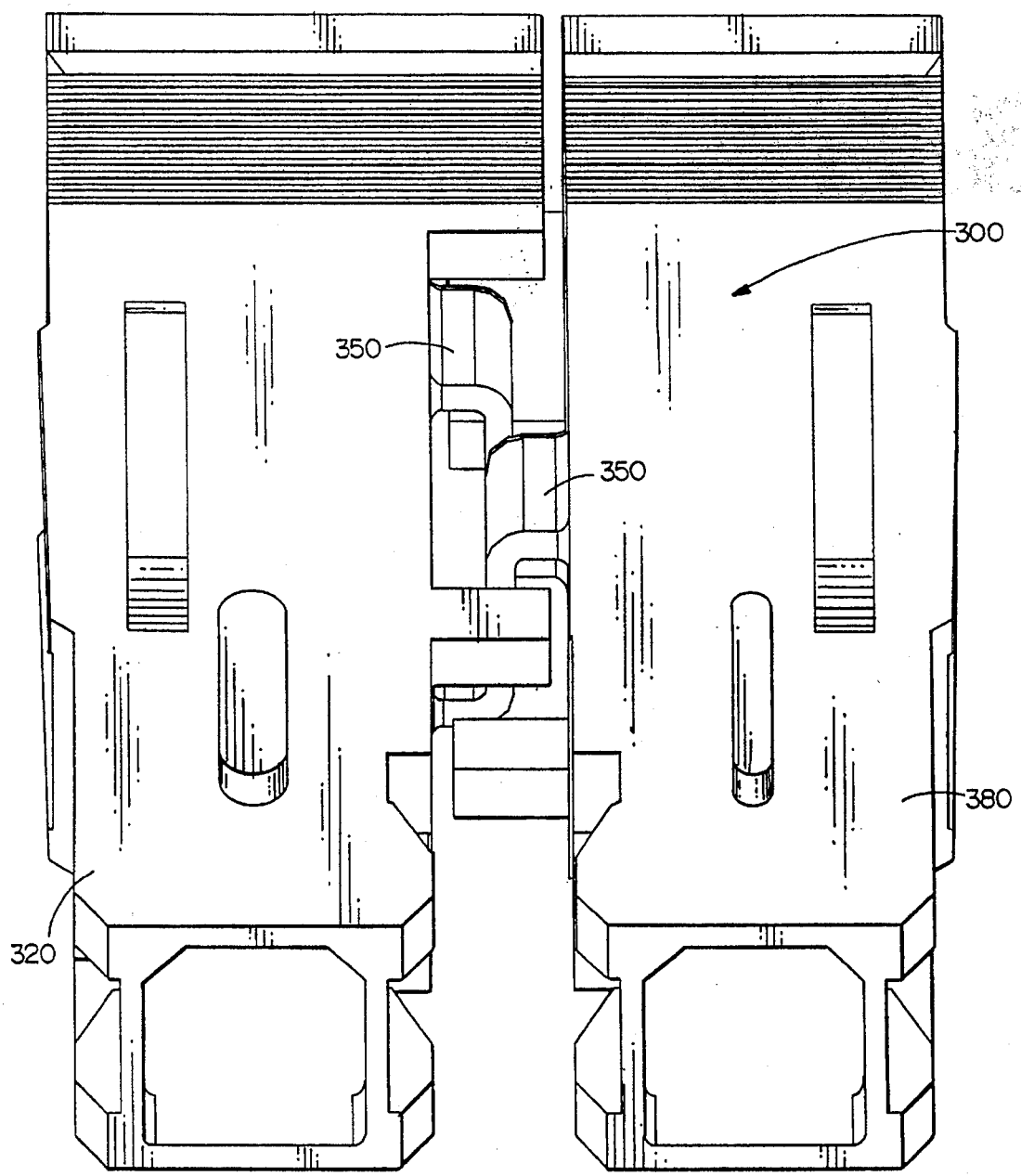
Figure 12:
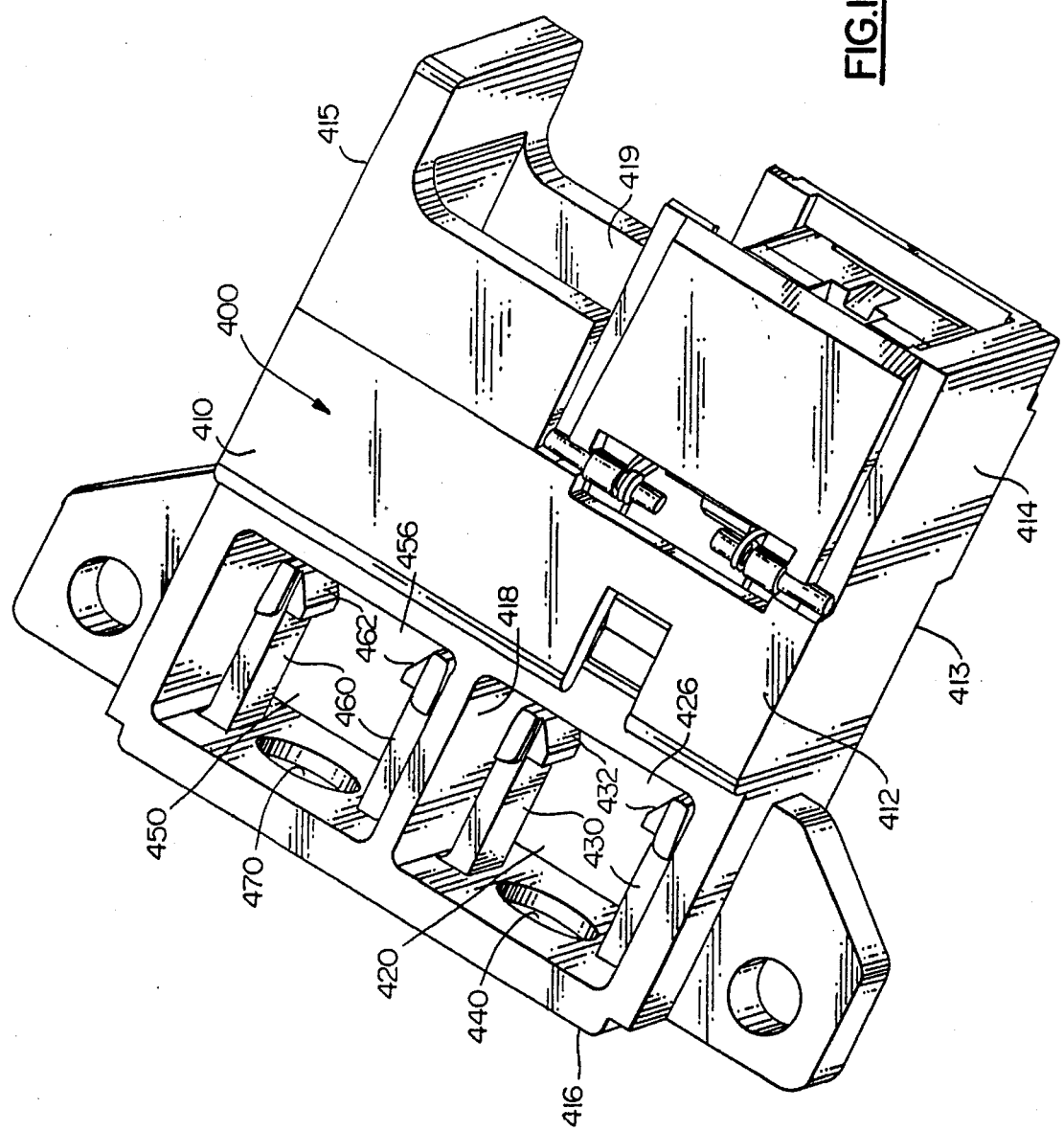

FIG. 10(a)–10(h) depicts the permitted motions of the individual FOCHs of the inventive fiber optic connector housing relative to each other;

FIG. 11 is a perspective view of a second embodiment of the inventive fiber optic connector housing;

FIG. 12 is a first perspective view of the inventive fiber optic receptacle;

FIG. 13 is a second perspective view of the inventive fiber optic receptacle;

FIG. 14 is an exploded, perspective view of the inventive fiber optic receptacle;

FIG. 15 is a perspective view, partially broken away, of the inventive fiber optic receptacle;

FIG. 16(a)–16(d) depicts the insertion of the inventive fiber optic connector housing into the inventive fiber optic receptacle, as well as the withdrawal of the former from the latter;

FIG. 17 depicts an optical assembly including the inventive fiber optic connector housing, the inventive fiber optic receptacle and an electro-optic module; and FIGS. 18–21 depict four inventive accessory devices, each of which includes one or more individual FOCHs.

DETAILED DESCRIPTION OF THE PREFERRED EMBODIMENT(S)

The invention involves a fiber optic connector housing including at least two individual FOCHs connected by at least one flexible member, all of integral construction, which allows the inventive fiber optic connector housing to be fabricated in accordance with the proposed ANSI standard, discussed above. The invention also involves a fiber optic receptacle including a receptacle housing and at least one pair, and preferably two pairs, of clips extending from a rear end of the receptacle housing, all of integral construction. In this regard, the inventive fiber optic receptacle is readily fabricated to conform to the dimensions of the inventive fiber optic connector housing and thereby also conform to the proposed ANSI standard, discussed above. The invention further involves accessories for electro-optic modules which include individual FOCHs, and preferably include the inventive fiber optic connector housing. Moreover, the invention involves optical assemblies which include one or more of the above components.

With reference to FIGS. 5–9, a first embodiment of the inventive fiber optic connector housing 300 includes at least two individual FOCHs 320 and 380 connected by a single, flexible, substantially S-shaped member 350 (see, in particular, FIGS. 7 and 8) extending directly from the individual FOCH 320 to the individual FOCH 380, which housing 300 is of integral construction. The flexible member 350 serves to maintain the individual FOCHs 320 and 380 in a substantially side-by-side relationship while permitting each of the individual FOCHs to move in at least four different directions relative to the other individual FOCH. These permitted movements of the individual FOCHs relative to one another are depicted in FIGS. 10a–10h and correspond to the movements depicted in FIGS. 2a–2h.

Figure 5:
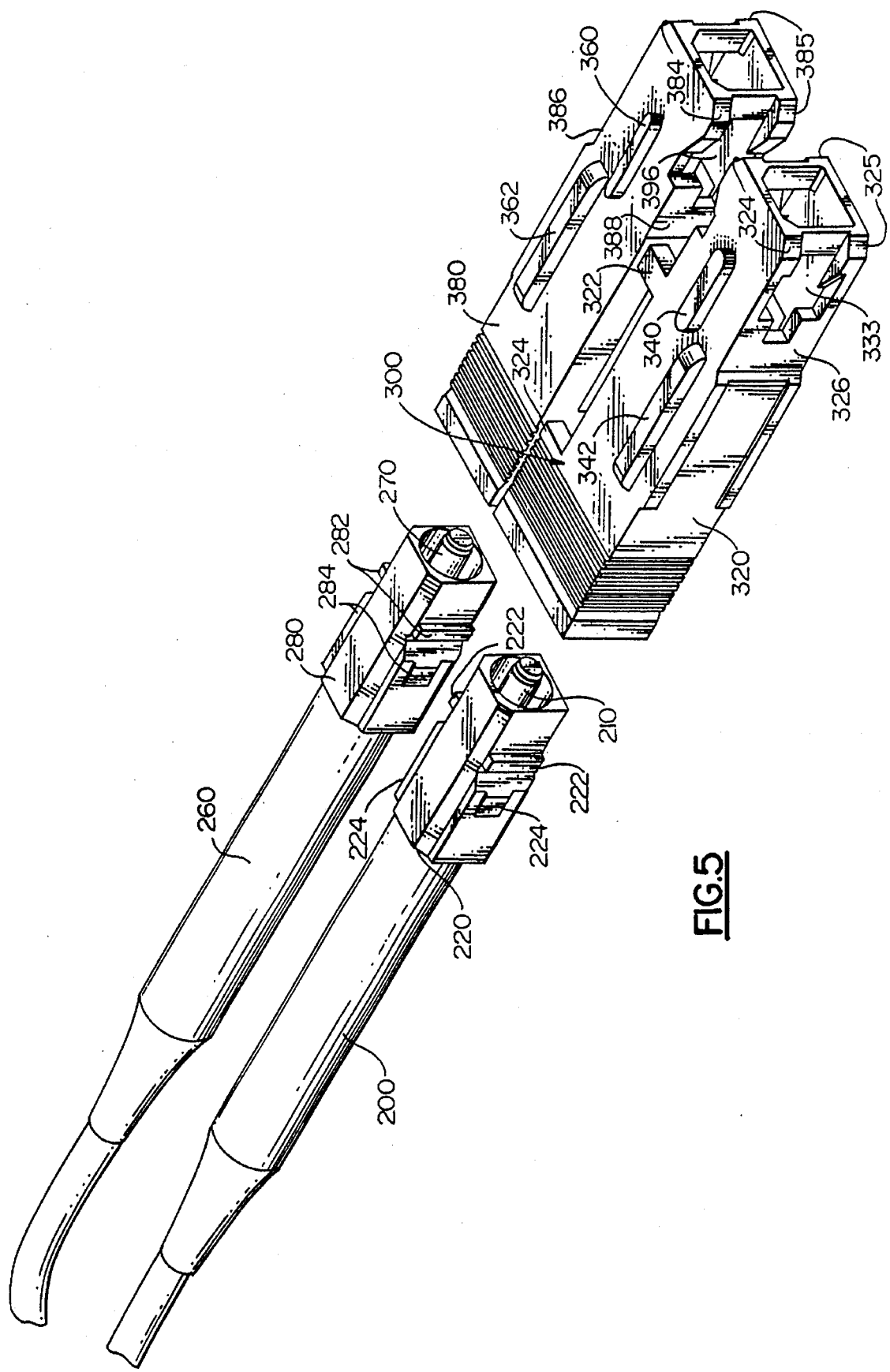
FIG. 5 is an exploded, perspective view of a fiber optic connector assembly including two plug frames, each of which includes an optical fiber-containing ferrule, in combination with a first embodiment of the inventive fiber optic connector housing.

To limit the extent of the movements of the individual FOCHs relative to one another, as shown, for example, in FIG. 5, the top surface of the individual FOCH 320 includes laterally projecting members 322 and 324 which extend toward the individual FOCH 380. Similarly, as shown, for example, in FIGS. 7–9, the bottom surface of the individual FOCH 380 includes laterally projecting members 382 and 384 which extend toward the individual FOCH 320.

Figure 1:
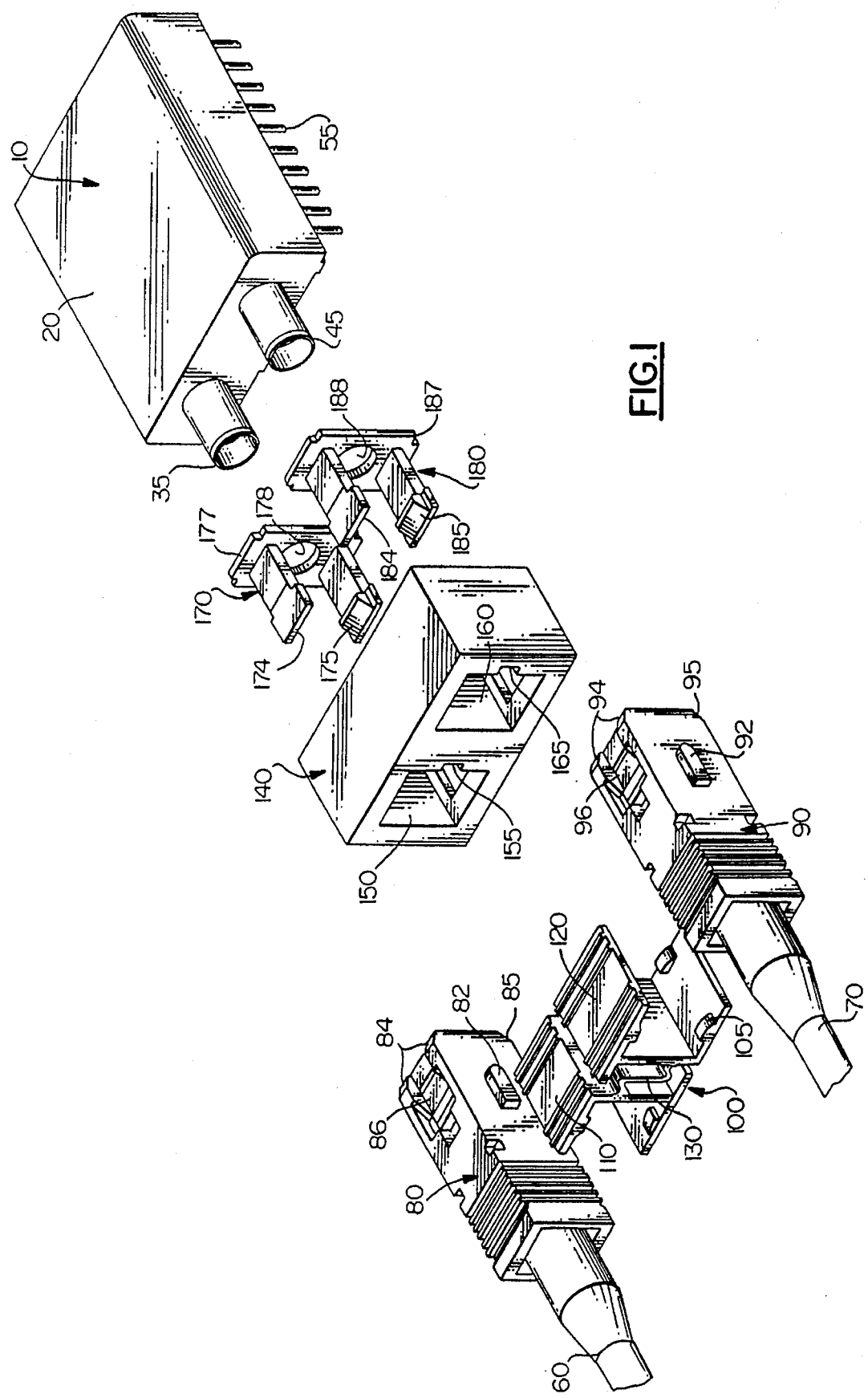
Figure 3:
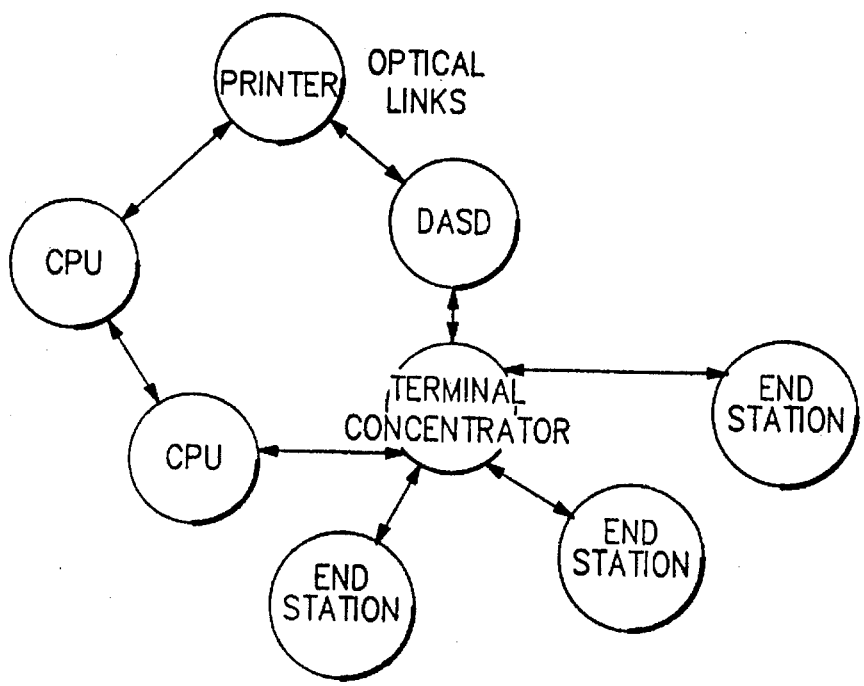
FIG. 3 is a schematic representation of a new, proposed communication system employing fiber optic links, in which the interconnected devices of the system are in a star network.
Figure 4:
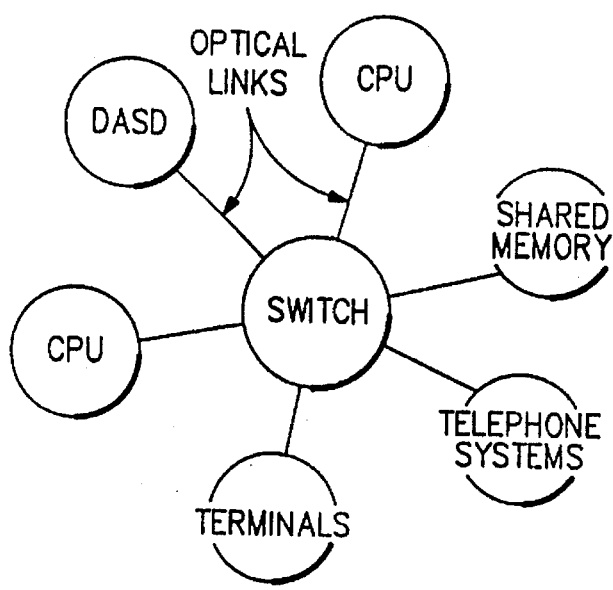
FIG. 4 is a schematic representation of a new, proposed communication system employing fiber optic links, in which all the devices of the system communicate through a central optical switch.

As depicted in FIG. 5, the individual FOCH 320 is capable of receiving a plug frame 220 containing a ferrule 210 which, in turn, contains the end of an optical fiber 200, e.g., a receive optical fiber, encased in one or more plastic sheaths. Similarly, the individual FOCH 380 is capable of receiving a plug frame 280 containing a ferrule 270 which, in turn, contains the end of an optical fiber 260, e.g., a transmit optical fiber, encased in one or more plastic sheaths. The plastic sheathed optical fibers 200 and 260 are, for example, single mode fibers, and these plastic sheathed optical fibers preferably merge into a plastic sheathed fiber optic cable. As shown in FIGS. 5–9, each of the individual FOCHs 320 and 380 is preferably of the so-called push-pull type available from NTT and referred to as SC-01 straight plug connector. However, in accordance with the invention, the orientation of each of the individual FOCHs is rotated by ninety degrees relative to the conventional orientation, depicted in FIG. 1. Consequently, each of the individual FOCHs is still hollow and generally rectangular in cross-section. But, in this new orientation, the height of each of the individual FOCHs is, for example, 0.293 inches (7.45 mm), while the width of each of the individual FOCHs is, for example, 0.356 inches (9.05 mm). If the thicknesses of the walls of the individual FOCHs is, for example, 0.043 inches (1.10 mm), as is conventional, and if the width of the flexible member 350 is, for example, 0.142 inches (3.60 mm), as is also conventional, then the spacing from the center of one individual FOCH to the center of the other individual FOCH, and therefore the spacing between the centers of the ferrules 220 and 280 after insertion into the individual FOCHs, is 0.5 inches (12.7 mm). Consequently, the inventive fiber optic connector housing 300 readily meets the center-to-center spacing requirement of the proposed ANSI standard.

It should be noted that the height of the flexible member 350, i.e., the distance from the top of the S to the bottom of the S, is, for example, 0.106 inches (2.7 mm). Therefore, if one were to fabricate the individual FOCHs to have the dimensions given above, the height of each of the individual FOCHs would necessarily be greater than that of the flexible member 350, and therefore the height of the inventive fiber optic connector housing would necessarily be that of the individual FOCHs, which would be 0.289 inches (7.45 mm).

In addition, the width of the inventive fiber optic connector housing would just be the sum of the widths of the individual FOCHs and flexible member, which is just 0.856 inches (21.75 mm). Consequently, the inventive fiber optic connector housing 300 readily meets the height and width requirements of the proposed ANSI standard.

With reference again to FIG. 5, each of the individual FOCHs includes conventional symmetrical, inclined surfaces at the front end of the individual FOCH which are to be engaged by the camming surfaces of a corresponding pair of clips in the inventive, fiber optic receptacle, described below. Thus, for example, the individual FOCH 320 includes the symmetrical, inclined surfaces 324 and 325, depicted in FIG. 5, while the individual FOCH 380 includes the symmetrical, inclined surfaces 384 and 385, also depicted in FIG. 5.

As also shown in FIG. 5, each of the individual FOCHs 320 and 380 includes two opposed apertures in two opposed walls of the individual FOCH, adjacent the corresponding, symmetrical, inclined surfaces at the front of the individual FOCH. However, because of the change in orientation of each individual FOCH, these apertures are located in opposed vertical sidewalls of the individual FOCH, rather than opposed horizontal sidewalls of the FOCH, as is conventional. Thus, the individual FOCH 320 includes two opposed apertures 333 (shown) and 336 (not shown) in opposed, vertical sidewalls 326 (shown) and 328 (not shown), adjacent the symmetrical, inclined surfaces 324 and 325. Similarly, the individual FOCH 380 includes two opposed apertures 393 (not shown) and 396 (shown) in opposed, vertical sidewalls 386 and 388, adjacent the symmetrical, inclined surfaces 384 and 385. As is evident, and by virtue of the changes in orientation of the individual FOCHs 320 and 380, the aperture 336 (not shown) of individual FOCH 320 faces the aperture 396 (shown) of individual FOCH 380.

Figure 6:
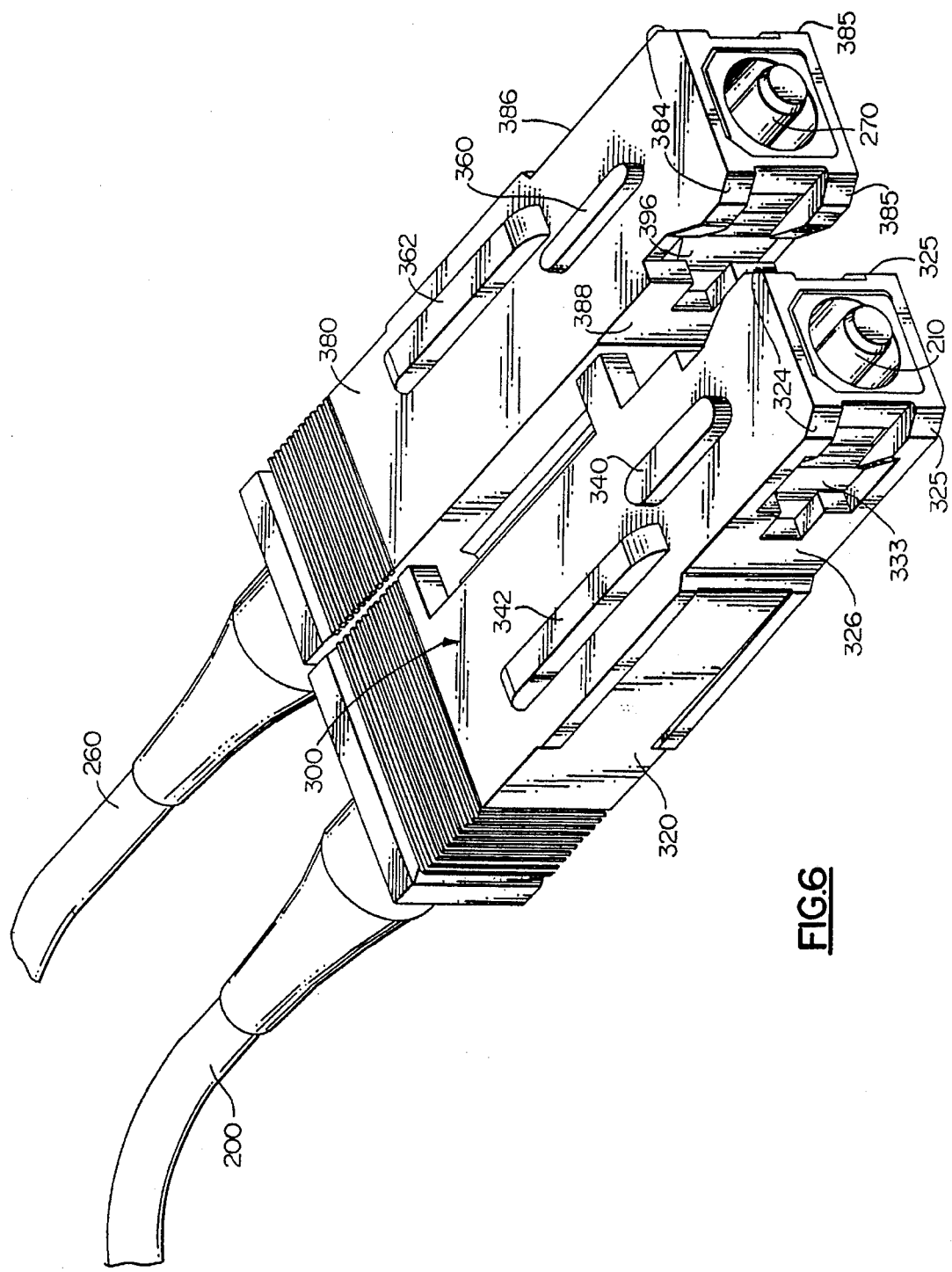
FIG. 6 is an unexploded perspective view of the fiber optic connector assembly of FIG. 5.
Figure 7:
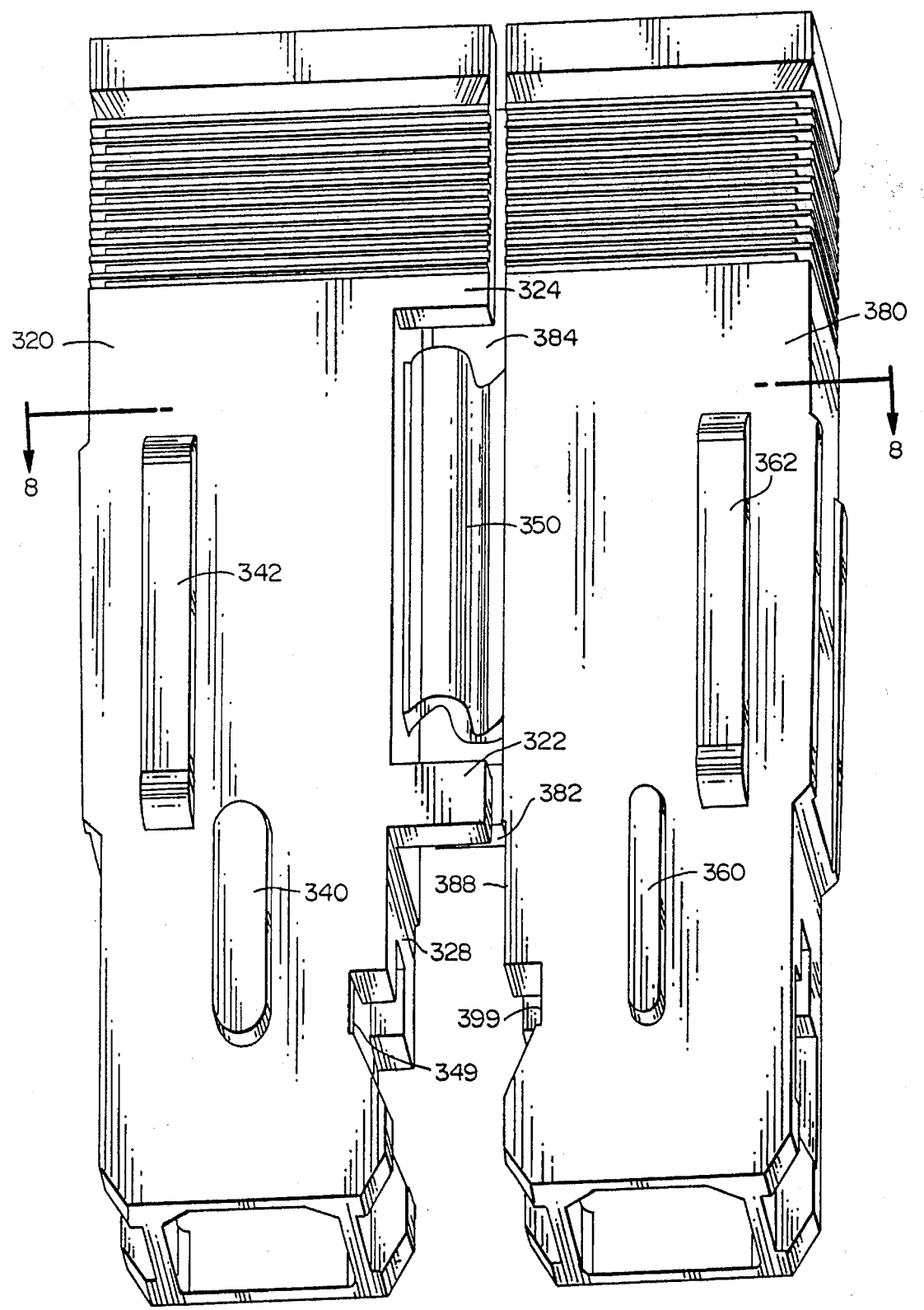
FIG. 7 is a perspective view of the first embodiment of the inventive fiber optic connector housing.
Figure 8:
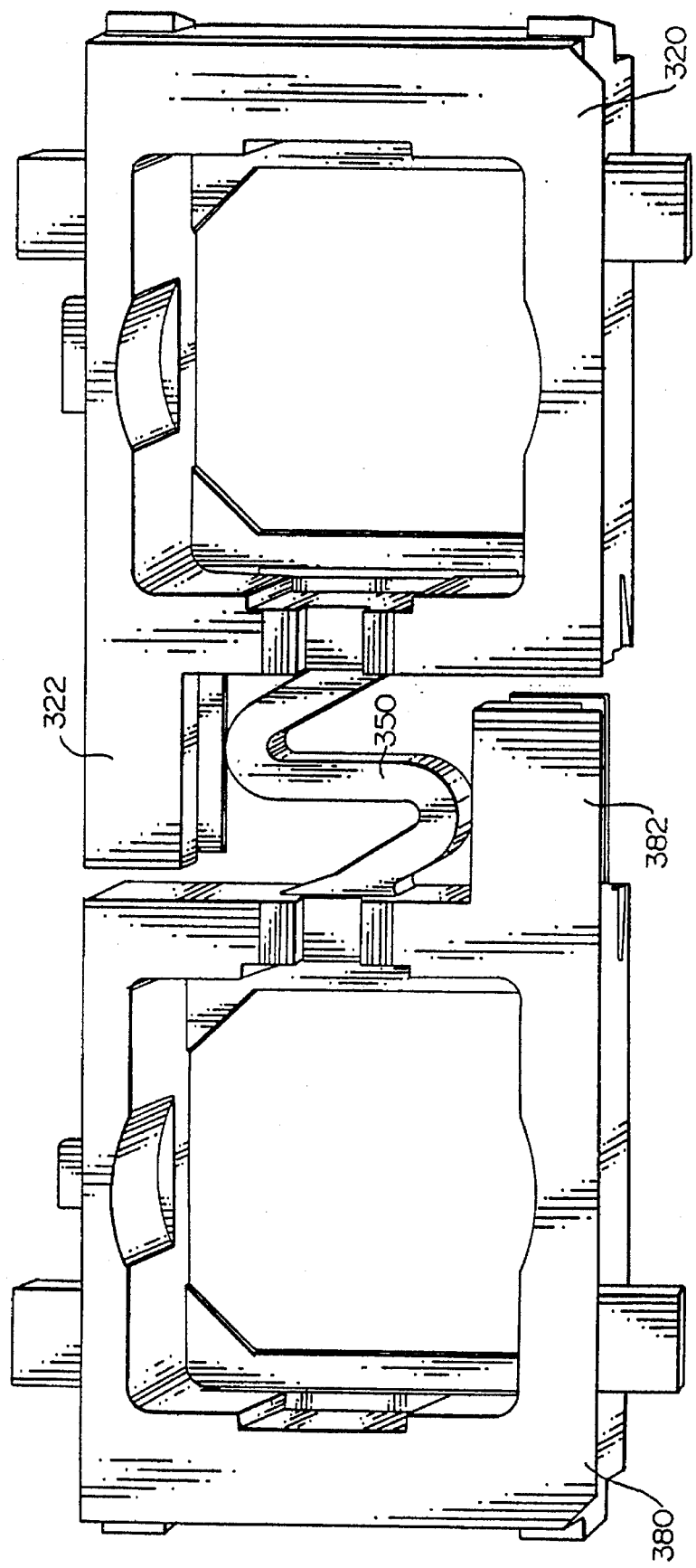
FIG. 8 is a cross-sectional view of the first embodiment of the inventive fiber optic connector housing, partially in perspective, taken along the line 8—8 in FIG. 7.

As is conventional, the purpose of the apertures 333 and 336 in individual FOCH 320 and of apertures 393 and 396 in individual FOCH 380 relates to the plug frames 220 and 280 containing, respectively, optical fiber 200 inserted into ferrule 210 and optical fiber 260 inserted into ferrule 270. That is, when plug frame 220 is inserted into individual FOCH 320 and plug frame 280 is inserted into individual FOCH 380, as depicted in FIG. 6, the ferrules 210 and 270 protrude through the open ends of the individual FOCHs 320 and 380. However, the raised portions 222 (see FIG. 5) on the sides of the plug frame 220 and the raised portions 282 (see FIG. 5) on the sides of the plug frame 280 serve to engage the vertical walls defining the forward ends of apertures 333, 336, 393 and 396 if the plug frames are pushed too far forward within the individual FOCHs 320 and 380, preventing the plug frames from being inadvertently pushed out of the individual FOCHs and preventing the ferrules 210 and 270 from extending more than is desired from the open ends of the individual FOCHs 320 and 380. In addition, the raised portions 224 (see FIG. 5) on the sides of plug frame 220 and the raised portions 284 (see FIG. 5) on the sides of plug frame 280 serve to engage the vertical walls defining the rearward ends of the apertures 333, 336, 393 and 396, preventing the plug frames 220 and 280 from being inadvertently withdrawn from the individual FOCHs 320 and 380. Moreover, after the individual FOCHs 320 and 380 of the inventive fiber optic connector housing 300 are inserted into the inventive fiber optic receptacle, described below, the presence of the apertures 333, 336, 393 and 396 permits the clips of the inventive fiber optic receptacle to engage the plug frames 220 and 280, thereby maintaining these plug frames in proper alignment, as described more fully below.

As noted above, the inventive fiber optic connector housing 300 is of integral construction (and therefore there is no need to assemble the individual FOCHs 320 and 380 and flexible member 350) and is preferably-entirely-of plastic, e.g., polycarbonate/acrylonitrile butadiene and styrene blend. In addition, the inventive fiber optic connector housing 300 is readily fabricated using conventional molding techniques, e.g., conventional injection molding techniques. However, as also noted above, at the completion of the molding process, to separate several parts of the (conventional) mold from the inventive fiber optic connector housing 300 without breaking the housing 300, it has been found necessary to introduce notches 349 and 399 (see FIG. 7) into the facing, vertical sidewalls 328 and 388 of the individual FOCHs 320 and 380, with each notch extending through the thickness, along the full height and partially along the width of the corresponding sidewall. Moreover, these notches, which have their counterparts in the mold used to form the inventive fiber optic connector housing 300, are preferably introduced into the very areas of the sidewalls 328 and 388 containing the two facing, symmetrical apertures 336 and 396, thereby introducing asymmetries into the two apertures. But, as noted above, and contrary to previous beliefs, the presence of these particular asymmetries (more fully described below) does not result in asymmetric forces being exerted on the individual FOCHs 320 and 380 during the insertion of the inventive fiber optic connector housing 300 into, for example, the inventive fiber optic receptacle, described below. As a result, the inventive fiber optic connector housing 300 readily achieves alignment accuracies of one micrometer or less.

Figure 9:
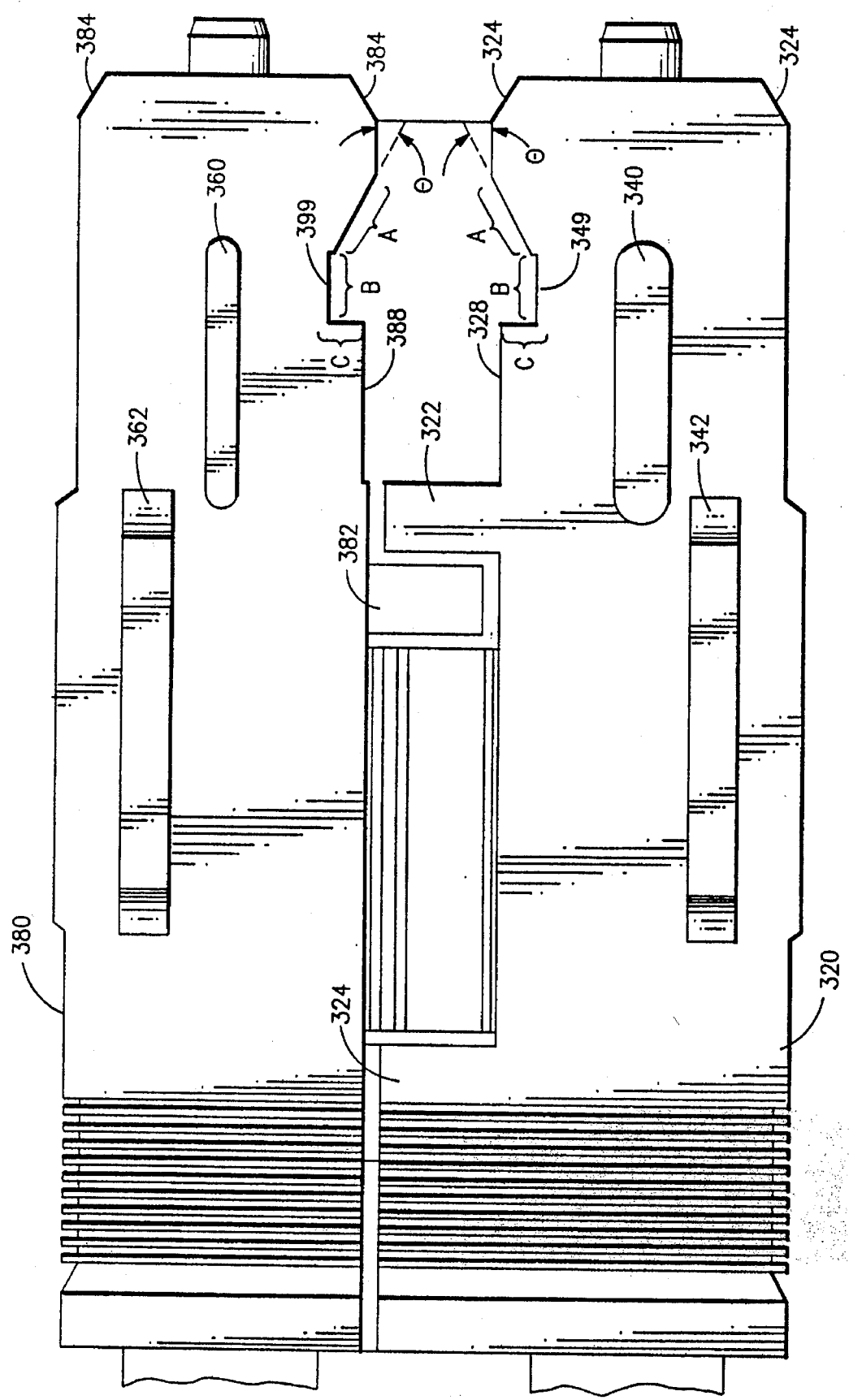
FIG. 9 is a top view of the first embodiment of the inventive fiber optic connector housing.
Figure 10E:
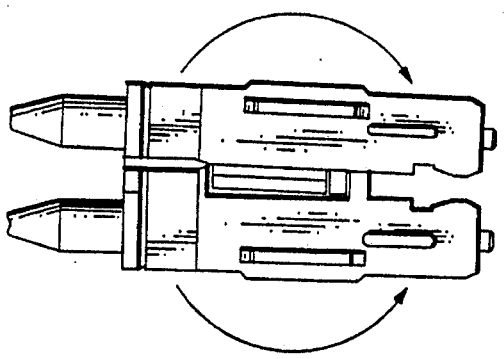
Figure 10F:
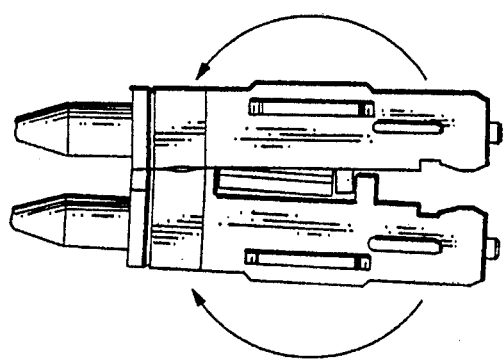
Figure 10G:
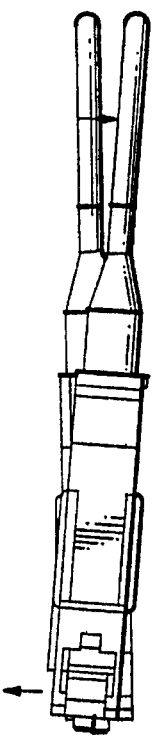
Figure 10H:
Figure 10A:
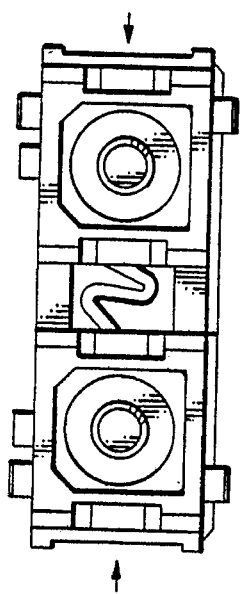
Figure 10B:
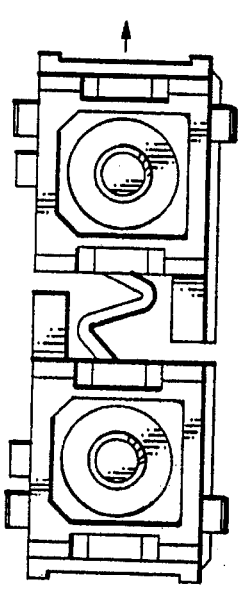
Figure 10C:
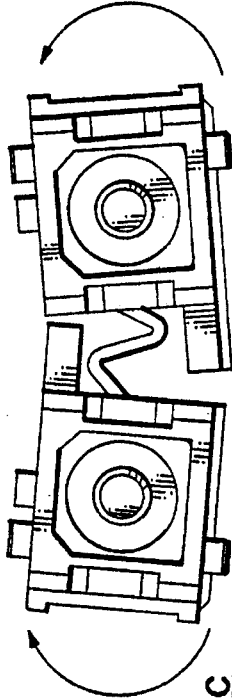
Figure 10D:
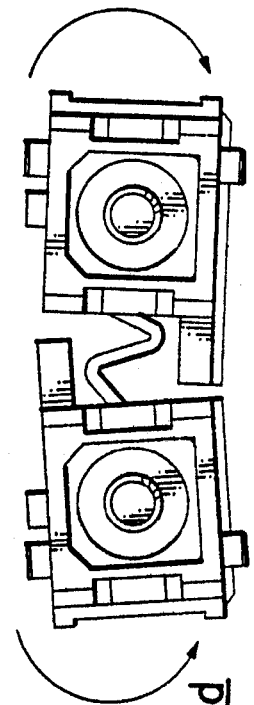

With reference now to FIG. 9, if each of the individual FOCHs 320 and 380 is of the type provided by NTT and referred to as SC-01 straight plug connector, as is preferred, then, as noted, the notch 349 is preferably co-located with the aperture 336 and the notch 399 is preferably co-located with the aperture 396. In addition, as viewed in FIG. 9, each of the notches 349 and 399 preferably includes three sections. The first section, which in each case is denoted by the letter A, starts at a distance of, for example, 0.118 inches (3.0 mm) from the front of the corresponding individual FOCH. Significantly, each such first section A is inclined at an angle, theta, relative to the corresponding sidewall, which is equal to, for example, 22 degrees. Moreover, each such first section A extends for a length of, for example, 0.100 inches (2.54 mm). Each second section, which is denoted by the letter B, runs parallel to the corresponding sidewall and extends for a length equal to, for example, 0.089 inches (2.25 mm). Each third section, which is denoted by the letter C, is perpendicular to the corresponding sidewall, and extends for a length equal to, for example, 0.045 inches (1.15 mm), which usually corresponds to the thickness of the sidewall.

As is evident from FIG. 9, the notches 349 and 399 are symmetrical. Moreover, as is also evident from FIG. 9, if these notches were to be combined, then the combined notches would be substantially V-shaped in outline.

As shown, for example, in FIGS. 5 and 6, the individual FOCH 320 includes a key 340 and the individual FOCH 380 includes a key 360, which keys are intended for insertion into corresponding keyways in the inventive fiber optic receptacle, described below. Significantly, the key 360 is differently dimensioned from the key 340, i.e., the width of the key 360 is less than that of the key 340. The purpose of having differently dimensioned keys is to ensure that if, for example, the inventive fiber optic connector housing 300 houses single mode fibers, that this housing 300 will only fit into a fiber optic receptacle which is to receive such single mode fibers, i.e., the fiber optic receptacle will have differently dimensioned keyways, adapted to receive the differently dimensioned keys. On the other hand, the differently dimensioned keys 340 and 360 are also intended to prevent the inventive fiber optic connector housing 300 from fitting into a fiber optic receptacle having, for example, equally dimensioned keyways, adapted to receive a fiber optic connector housing containing, for example, multi-mode fibers.

As also shown in, for example, FIGS. 5 and 6, the individual FOCH 320 includes a spacer 342 both on the top and on the bottom of the individual FOCH, while the individual FOCH 380 includes a spacer 362 both on the top and on the bottom of the individual FOCH. These spacers 342 and 362 serve to centrally position the individual FOCHs in the inventive, fiber optic receptacle, described below, when the inventive fiber optic connector housing 300 is inserted into the inventive fiber optic receptacle.

With reference now to FIG. 11, a second embodiment of the inventive fiber optic connector housing 300 differs from the first only in that this second embodiment includes two flexible, substantially S-shaped members 350 connecting the individual FOCHs 320 and 380. It is noteworthy that the two flexible, substantially S-shaped members 350 are arranged crosswise relative to one another, with the top of the S of one member 350 corresponding to the bottom of the S of the other member 350 and vice versa.

A preferred embodiment of the inventive, fiber optic receptacle 400, which is adapted to receive the inventive fiber optic connector housing 300, is depicted in FIG. 12. As shown, the receptacle 400 includes a hollow receptacle housing 410 which, in cross-section, is generally rectangular. The receptacle housing 410 itself includes top and bottom walls 412 and 413, sidewalls 414 and 415 and a rear wall 416. In addition, the receptacle housing 410 preferably includes a wall 418 which extends perpendicularly from the rear wall 416 and serves to separate the rear of the housing 410, adjacent the rear wall 416, into two compartments 420 and 450, substantially of equal size. It should be noted that at the open front end of the receptacle housing 410, the top and bottom walls 412 and 413, as well as the side walls 414 and 415, define a channel 419 into which the inventive fiber optic connector housing 300 is to be inserted.

As shown in FIG. 12, the inventive fiber optic receptacle 400 also includes at least a first pair of clips 430, and preferably also a second pair of clips 460, which extend perpendicularly from the rear wall 416 into the compartments 420 and 450. To conform to the orientation of the apertures in the side walls of the individual FOCHs of the inventive fiber optic connector housing 300, the orientations of the two pairs of clips 430 and 460 have been rotated by ninety degrees relative to the orientations of the clips depicted in FIG. 1. In addition, the pair of clips 430 includes symmetrical camming surfaces 432, and the pair of clips 460 includes symmetrical camming surfaces 462, adapted to engage the symmetrical, inclined surfaces and (asymmetrical) apertures of the individual FOCHs of the inventive fiber optic connector housing 300.

As also shown in FIG. 12, the rear wall 416 includes an aperture 440, centrally located between clips 430, and an aperture 470, centrally located between clips 460, which apertures are intended to receive the two bores of an electro-optic module.

Significantly, as noted above, the fiber optic receptacle housing 410 and the two pairs of clips 430 and 450 are of integral construction. Consequently, there is no need to assemble this housing and these clips. In addition, the inventive fiber optic receptacle 400 is readily dimensioned to receive the inventive fiber optic connector housing 300, when dimensioned in accordance with the proposed ANSI standard, thereby also conforming to this proposed standard.

The inventive fiber optic receptacle 400 is preferably fabricated using conventional molding techniques, e.g., conventional injection molding techniques. Moreover, the fiber optic receptacle housing 410 and two pairs of clips 430 and 460 are preferably entirely of plastic, e.g., polycarbonate/acrylonitrile butadiene and styrene blend.

As noted above, at the completion of the molding process used to fabricate the inventive fiber optic receptacle 400, to separate several parts of the corresponding (conventional) mold from the fiber optic receptacle 400 without breaking the receptacle 400, it has been found necessary to introduce openings into the walls of the receptacle housing 410. That is, as shown in FIG. 12, it has been found necessary to introduce identical openings 425 (not shown) and 426 (shown) into the bottom and top walls 413 and 412, directly below and above the compartment 420, containing the pair of clips 430. In addition, it has been found necessary to introduce identical openings 455 (not shown) and 456 (shown) into the bottom and top walls 413 and 412, directly below and above the compartment 450, containing the pair of clips 460. As depicted, these openings 425, 426, 455 and 456 are preferably rectangular in outline. In addition, these openings, which have their counterparts in the mold used to fabricate the inventive fiber optic receptacle 400, extend longitudinally from the rear end of the receptacle housing 410, where the two bores of an electro-optic module are to be received, toward the front end of the receptacle housing 410, where the inventive fiber optic connector housing 300 is to be received. Moreover, the longitudinal extent of these openings is greater than that of the two pairs of clips 430 and 460.

As shown in FIG. 13, the top wall 412 of the receptacle housing 410 includes differently dimensioned keyways 435 and 465 adapted to receive the differently dimensioned keys 340 and 360 on the individual FOCHs 320 and 380 of the inventive fiber optic connector housing 300. Obviously, because the longitudinal extent of the openings 426 and 456 in the top wall 412 is greater than that of the two pairs of clips 430 and 460, it follows that the keyways 435 and 465 do not extend all the way to the two pairs of clips. However, in accordance with the invention, the longitudinal spacing between the front end of each pair of clips 430 and 460 and the corresponding keyway is preferably no greater than the longitudinal extent of the front end of the individual FOCH to be engaged by the pair of clips, containing the symmetrical, inclined surfaces to be engaged by the symmetrical camming surfaces of the clips. Provided this longitudinal spacing requirement is met, the keyways 435 and 465 are effective in properly aligning the individual FOCHs relative to the bores to be inserted at the rear end of the inventive fiber optic receptacle 400, and in enabling the corresponding transmit and receive optical fibers to achieve micrometer-accurate alignment. By way of example, the longitudinal extent of the front end of each of the individual FOCHs 320 and 380 depicted in FIG. 9, including just the corresponding inclined surfaces 324/325 and 384/385 is, for example, 0.055 inches (1.39 mm). Therefore, provided the longitudinal spacing between the keyway 435 and the pair of clips 430, as well as the longitudinal spacing between the keyway 465 and the pair of clips 460, is, for example, 0.038 inches (0.96 mm), the keyways 435 and 465 will be effective in properly aligning the individual FOCHs 320 and 380 of the inventive fiber optic connector housing 300 relative to the bores to be inserted at the rear end of the inventive fiber optic receptacle 400.

With reference to FIGS. 14 and 15, the left-hand portion (as viewed in FIGS. 14 and 15) of the channel 419 of the inventive fiber optic receptacle 400, which is aligned with the compartment 420, contains a first shutter 490, which is pivotably connected to the bottom wall 413 of the receptacle housing 410, and a second shutter 510, which is positioned behind the first shutter 490 and is pivotably connected to the top wall 412 of the receptacle housing 410. These two shutters are intended to prevent any light which might emanate from the bore of a TOSA received in compartment 420 from reaching human eyes when there is no fiber optic cable in the channel 419.

As shown in FIGS. 14 and 15, the shutter 490 extends upwardly into the channel 419 through an aperture in the bottom wall 413 of of the fiber optic receptacle housing 410. As also shown, the bottom of the shutter 490 includes two cylindrical arms 492 and 494 which contact the bottom of the wall 413. These cylindrical arms 492 and 494 are encircled by a helical spring 496 which serves to bias the shutter 490 to the vertical position shown in FIG. 15, where the shutter 490 serves to block light. By pushing inwardly on the shutter 490, this shutter is readily pivoted to a substantially horizontal position, where it serves to block relatively little light.

The shutter 510 extends downwardly into the channel 419 through an aperture in the top wall 412 of the fiber optic receptacle housing 410. As shown, the top of the shutter 510 includes two cylindrical arms 512 and 514 which contact the top of the wall 412. These cylindrical arms are encircled by a helical spring 516 which serves to bias the shutter 510 to the vertical position shown in FIG. 15, where the shutter 510 serves to block light. By pushing inwardly on the shutter 510, this shutter is also readily pivoted to a substantially horizontal position, where it serves to block relatively light.

Significantly, as shown in FIGS. 14 and 15, the body of the shutter 490 includes two interconnected portions 497 and 498. The first portion 497 is substantially rectangular and includes a central, substantially rectangular cutout. It is this first portion 497 which is adapted to be engaged by an individual FOCH inserted into the channel 419 and/or by a plug frame contained in the individual FOCH. The second portion 498 is generally L-shaped, is positioned directly behind the cutout in the first portion 497 and is connected to the first portion by the bottom of the L. This second portion, like the first portion, is adapted to block light when the shutter 490 is in the vertical position. However, this second portion is positioned so as to be aligned with a ferrule contained in the above-mentioned plug frame. But, because the second portion 498 is positioned behind the first portion 497, at a sufficient distance to avoid contact with the ferrule, there is no contact between the ferrule and the first shutter 490 when the individual FOCH is inserted into the channel 419, which might otherwise cause damage to the ferrule.

As with the body of the first shutter 490, the body of the second shutter 510 also includes two interconnected portions 517 and 518, having similar configurations to those of the interconnected portions 497 and 498 of the first shutter 490, for the reasons given above.

Figure 16A:
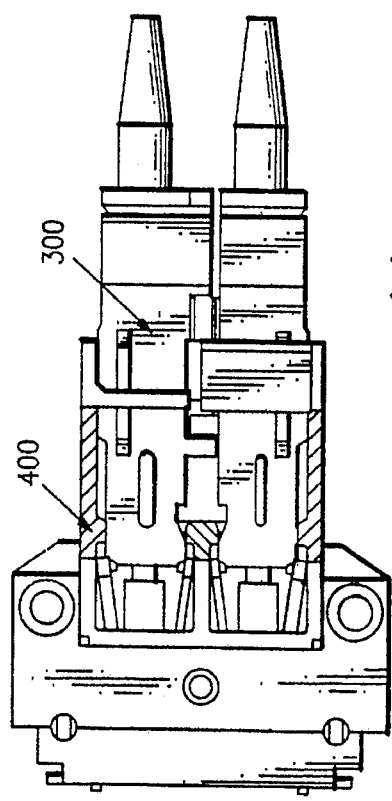
Figure 16B:
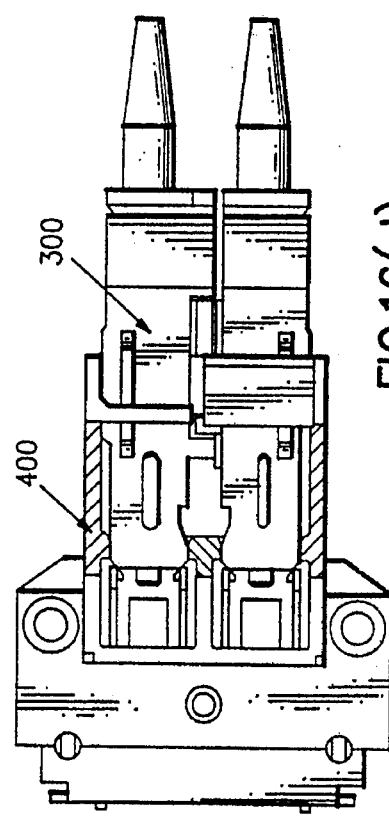
Figure 16C:
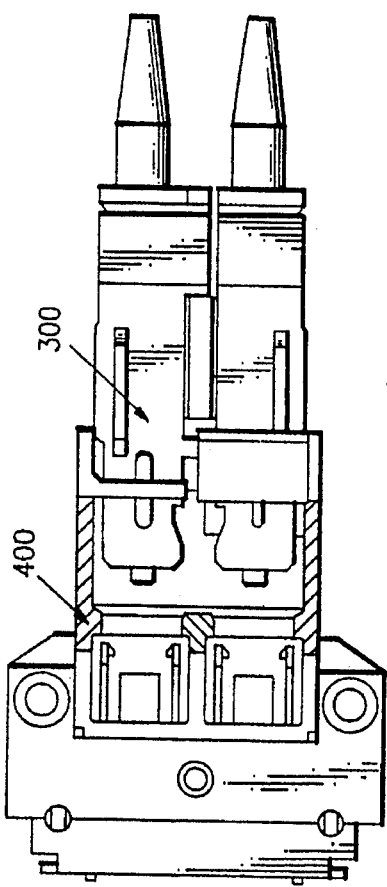
Figure 16D:
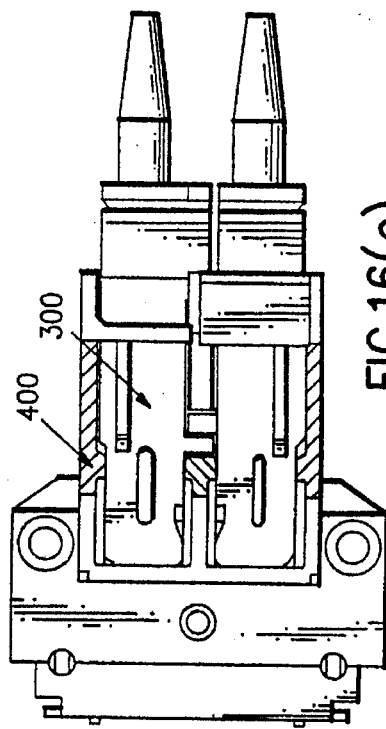

The manner in which the inventive fiber optic connector housing 300 is inserted into the inventive fiber optic receptacle 400, and the manner in which the latter serves to align the former relative to the bores of an electro-optic module, are depicted in FIGS. 16(a)–16(b). On the other hand, the manner in which the former is withdrawn from the latter is depicted in FIGS. 16(c)–16(d). It should be noted that the mechanical interactions between the symmetrical, inclined surfaces of the individual FOCHs and the camming surfaces of the clips is as described above.

The purpose of the inventive fiber optic connector housing 300 and inventive fiber optic receptacle 400 is, of couse, to align the optical fibers 200 and 260 (see FIGS. 5 and 6) with corresponding bores of a TOSA and ROSA of an optoelectronic module, thereby forming an optical assembly. Just such an optical assembly 1400 is depicted in FIG. 17. As shown, the optical assembly 1400 comprises an optoelectronic module 1300, which includes a housing 1200, consisting of lower and upper halves 1000 and 1100, containing a substrate 900, e.g., a circuitized, pinned, ceramic substrate, bearing TOSA and ROSA ICs. The optoelectronic module 1300 also includes a housing 800 which is connected to the housing 1200, and includes apertures 810 and 820. The optoelectronic module 1300 further includes a TOSA 600 which fits into the aperture 810 and is electrically connected to the TOSA ICs on the substrate 900. Moreover, the optoelectronic module 1300 still further includes a ROSA 700 which fits into the aperture 820 and is electrically connected to the ROSA ICs on the substrate 900.

The optical assembly 1400 also includes the inventive fiber optic receptacle 400 which is connected to the housing 800. Such connection is achieved by inserting the ears 522 and 524 of the receptacle 400 into corresponding slots 830 and 850 in the housing 800. As shown, an aperture 840 extends through the slot 830, which is aligned with the aperture 523 in the ear 522 of the receptacle 400. Similarly, an aperture 860 extends through the slot 850, which is aligned with the aperture 525 in the ear 524 of the receptacle 400. Thus, by inserting a pin 872 through aligned apertures 840 and 523, and by inserting a pin 874 through aligned apertures 860 and 525, the receptacle 400 is readily connected to the housing 800. As a consequence, the bores of the TOSA 600 and ROSA 700 extend into the compartments 420 and 450 at the rear of the receptacle 400.

Finally, as shown in FIG. 17, the optical assembly 1400 also includes the inventive fiber optic connector housing 300 containing two plug frames, each of which contains an optical fiber-containing ferrule. The housing 400 and its optical fiber containing ferrules become a part of the optical assembly 1400 by inserting the housing 300 into the receptacle 400, thereby automatically aligning the optical fibers contained in the housing 300 with the bores of the TOSA and ROSA 600 and 700.

Significantly, the invention also involves a number of accessory devices which have been developed for use in connection with electro-optic modules. The accessory devices developed to date include two devices for cleaning the lenses in the bores of optical subassemblies, a device (often called a wrap plug) for communicating the light produced by a TOSA of an electro-optic module to the ROSA of the same electro-optic module, as well as a shipping/storage plug for one or more optical subassemblies of an electro-optic module. All of these devices are related in the sense that each includes components which fit into one or more plug frames adapted to receive the components, and each plug frame fits into an unmodified, individual FOCH. If the device involves the use of two plug frames, then the two plug frames are preferably inserted into the inventive fiber optic connector housing 300.

Figure 18:
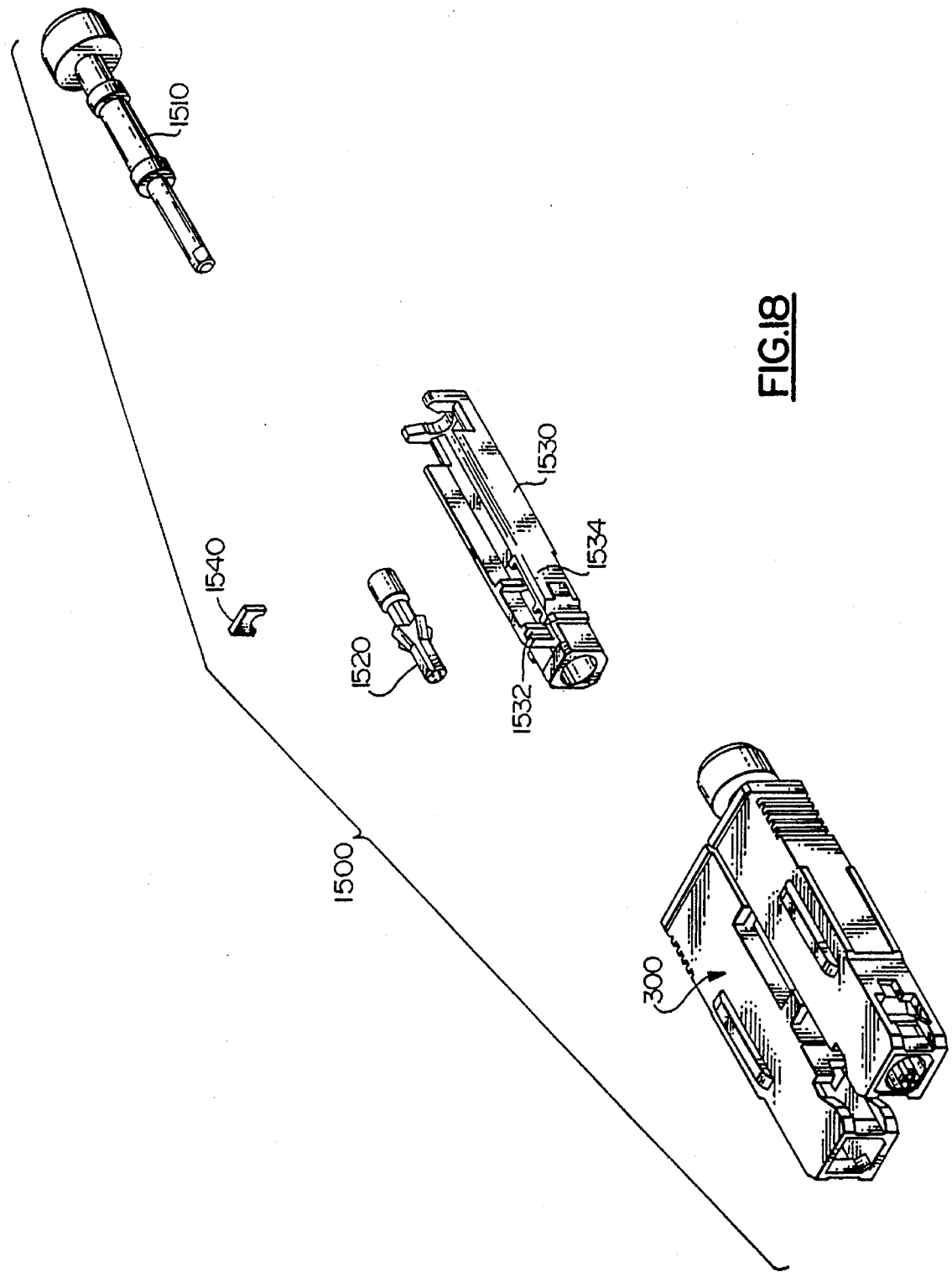

The first of the accessory devices, which is useful for cleaning the surface of a lens in a bore of an electro-optic module with a fluid, such as air, is depicted in FIG. 18 and is denoted by the number 1500. As shown, the device 1500 includes a hollow tube 1510 into which the cleaning fluid is to be injected. The device 1500 also includes a hollow, tubular nozzle 1520, through which the cleaning fluid is to be ejected, with the front end of the hollow tube 1510 fitting into the rear end of the nozzle 1520.

Significantly, as shown in FIG. 18, the device 1500 further includes an essentially conventional plug frame 1530 into which the nozzle 1520 and hollow tube 1510 are to be inserted, with the front of the nozzle 1520 protruding from the plug frame and the rear of the tube 1510 protruding from the rear of the plug frame. In this regard, it should be noted that the top of the plug frame has been removed to permit ready insertion of the nozzle 1520 and hollow tube 1510. Moreover, the body of the plug frame 1530 includes internal, aligned notches 1532 and 1534 into which a keeper 1540 is to be inserted, after the nozzle 1520 and hollow tube 1510 have been inserted into the plug frame 1530, for the purpose of keeping the nozzle and hollow tube in place.

Because the plug frame 1530 is essentially conventional, it is readily inserted into a conventional individual FOCH. By inserting the individual FOCH into a fiber optic receptacle connected to an electro-optic module, the lens in a bore of the module is readily cleaned with a fluid, such as air, simply by connecting a source of the fluid to the rear of the hollow tube 1510, and flowing the fluid into the hollow tube 1510 under pressure. This pressurized fluid will be ejected from the nozzle to impinge upon the surface of the lens to be cleaned.

If two plug frames, containing two nozzles and two hollow tubes, are to be used, then the two plug frames are preferably inserted into the inventive fiber optic connector housing 300, pictured in FIG. 18.

Figure 19:
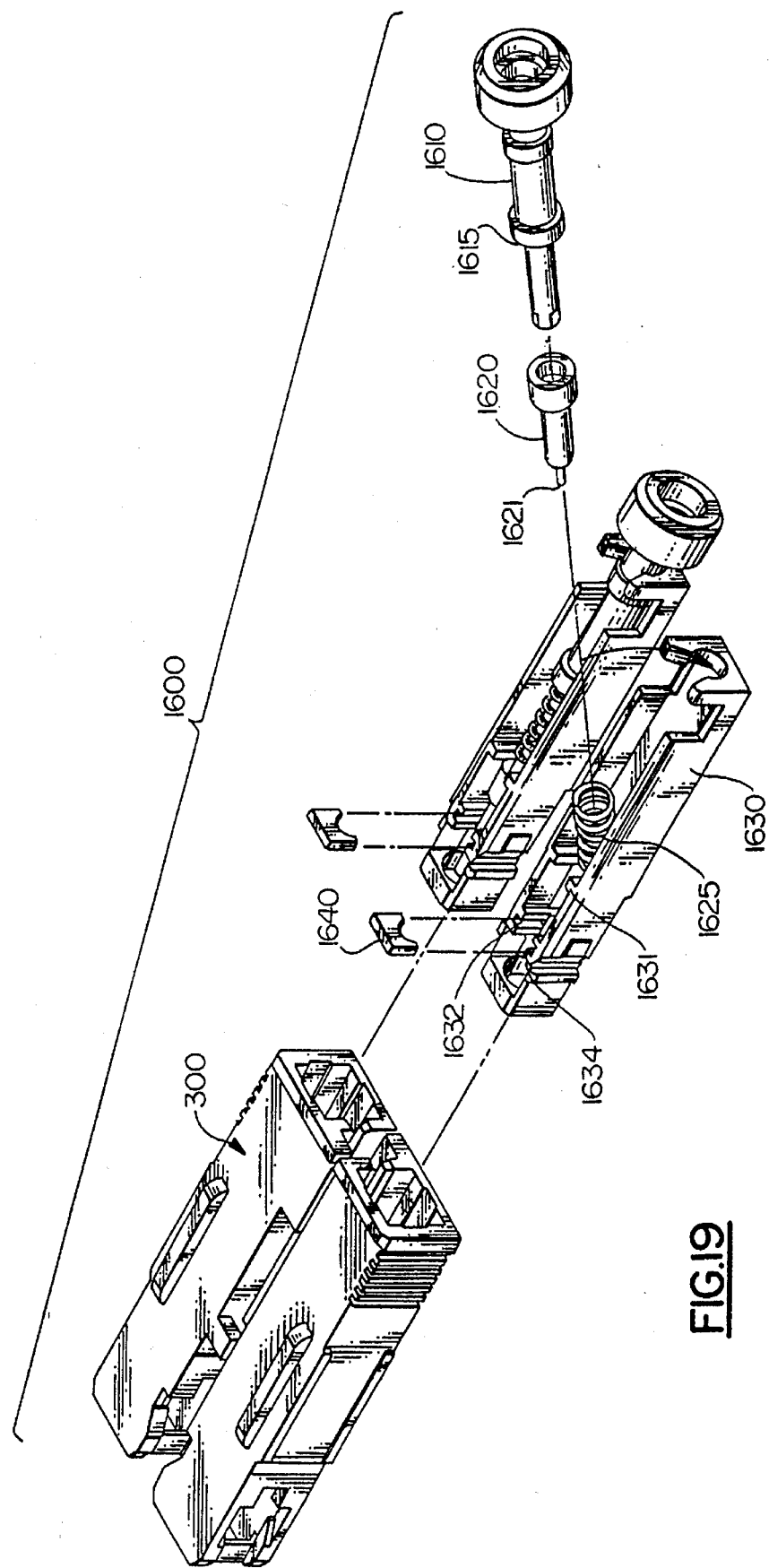

The second of the accessory devices, which is useful for brushing or wiping dirt from the surface of a lens in a bore of an electro-optic module, is depicted in FIG. 19 and is denoted by the number 1600. As shown, the device 1600 includes a hollow or solid rod 1610 which can, for example, be identical to the hollow tube 1510 shown in FIG. 18. In addition, the device 1600 includes a brush rod 1620, the front of which contains a brush-like member 1621 for brushing or wiping dirt from the surface of a lens, with the front end of the rod 1610 fitting into the rear of the brush rod 1620. Moreover, the device 1600 further includes a helical spring 1625 which encircles the brush rod 1620, with the rear end of the spring 1625 abutting an external shoulder 1615 of the rod 1610.

As before, the device 1600 also includes an essentially conventional plug frame 1630, which is identical to the plug frame 1530 pictured in FIG. 18. It should be noted that the plug frame 1630 (like the identical plug frame 1530) includes an internal shoulder 1631 and internal, aligned notches 1632 and 1634 adapted to receive a keeper 1640.

Because the top of the plug frame 1630 has been removed, the brush rod 1620, encircled by the helical spring 1625, and the rod 1610, are readily inserted into the plug frame 1630. Once so inserted, the front of the helical spring abuts the internal shoulder 1631 of the plug frame 1630, while the rear of the helical spring abuts the external shoulder 1615 of the rod 1610. In addition, once the brush rod 1620, helical spring 1625 and rod 1610 are inserted into the plug frame, the keeper 1640 is inserted into the internal notches 1632 and 1634 for the purpose of keeping the brush rod 1620, helical spring 1625 and rod 1610 in place.

To brush or wipe the surface of a lens in a bore of an electro-optic module, one merely inserts the plug frame 1630 into a conventional individual FOCH, and inserts the individual FOCH into a fiber optic receptacle connected to the electro-optic module of interest. By pushing on the end of the (spring-loaded) rod 1610, the surface of the lens in the bore is brushed or wiped by the brush-like member 1621 on the end of the brush rod 1620.

If two plug frames 1630 are to be used, then the two plug frames are preferably inserted into the inventive fiber optic connector housing 300, pictured in FIG. 19.

Figure 20:
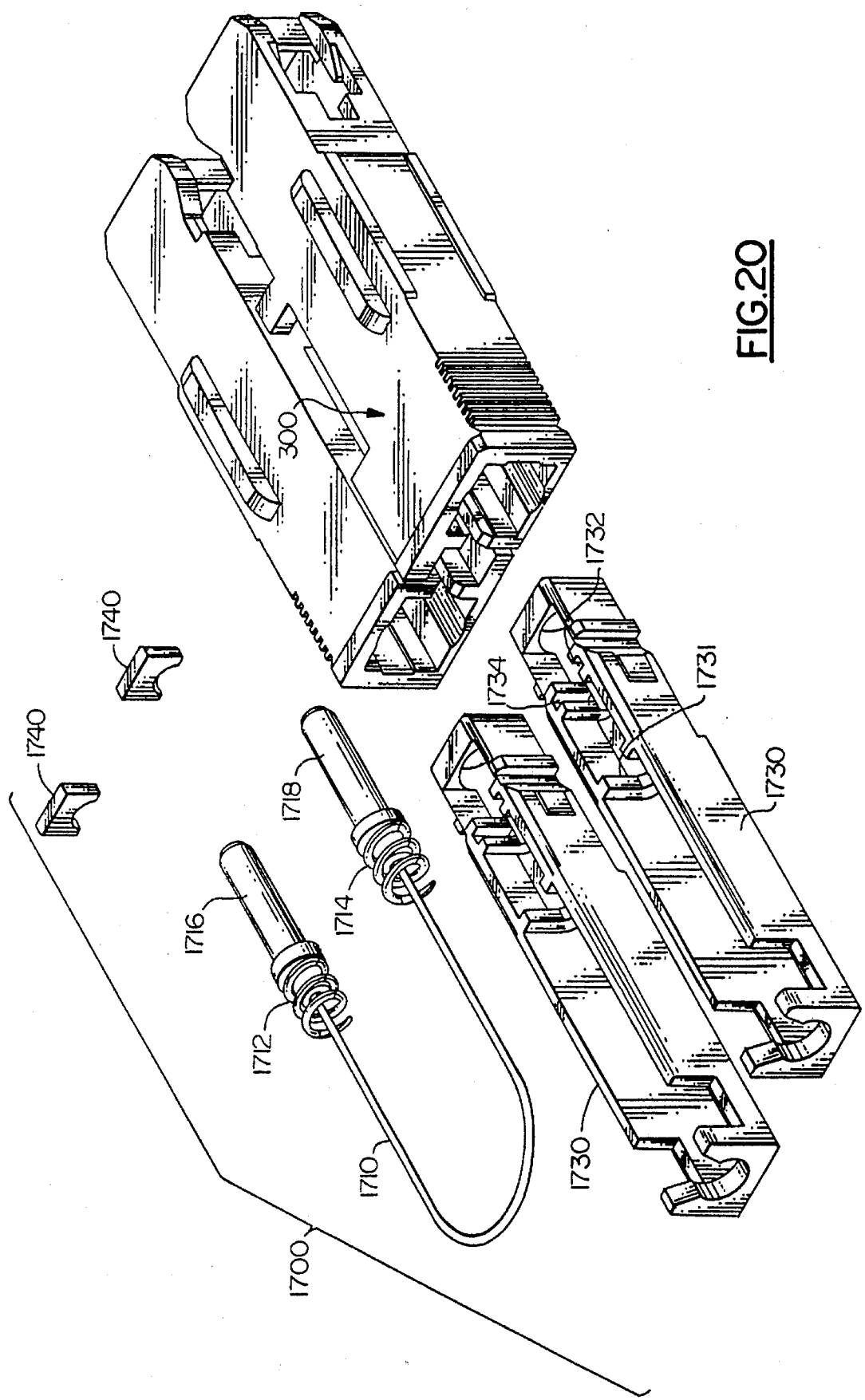

The third of the accessory devices, which is a wrap plug, is depicted in FIG. 20 and is denoted by the number 1700. As shown, the wrap plug 1700 includes an optical fiber 1710, e.g., a single mode fiber or a multi-mode fiber, with the opposite ends of the optical fiber 1710 being inserted into ferrules 1716 and 1718. A first helical spring 1712 encircles the optical fiber adjacent the ferrule 1716, and abuts an external shoulder of the ferrule 1716. In addition, a second helical spring 1714 encircles the optical fiber 1710 adjacent the ferrule 1718, and abuts an external shoulder of the ferrule 1718.

Significantly, the wrap plug 1700 also includes two essentially conventional plug frames 1730, which are identical to the plug frames 1630 and 1530 pictured in FIGS. 19 and 18. Each of these plug frames 1730 includes an internal shoulder 1731 and internal, aligned notches 1732 and 1734 which are adapted to receive a keeper 1740.

In use, the optical fiber 1710 is inserted into both of the plug frames 1730, with a first portion of the optical fiber 1710 being contained in one of the plug frames 1730, a second portion being contained in another of the plug frames 1730 and a third portion extending between the plug frames. In addition, the optical fiber 1710 is positioned so that the ferrule 1716 protrudes from the front of one of the plug frames 1730 and the rear of the helical spring 1712 abuts the internal shoulder 1731 of the corresponding plug frame. Moreover, the optical fiber 1710 is positioned so that the ferrule 1718 protrudes from the front of the other plug frame 1730 and the rear of the helical spring 1714 also abuts the internal shoulder 1731 of the corresponding plug frame. Further, the keepers 1740 are inserted into the internal notches 1732 and 1734 in the two plug frames in order to keep the optical fiber 1710, the helical springs 1712 and 1714, and ferrules 1716 and 1718 in place.

Because the wrap plug 1700 necessarily includes two plug frames 1730, these plug frames are preferably inserted into the inventive fiber optic connector housing 300. Thus, when the light emitted by a TOSA of an electro-optic module is to be communicated to the ROSA of the same module then, in accordance with the invention, the inventive fiber optic connector housing 300, containing the two plug frames 1730 and optical fiber 1710, is inserted into, for example, the inventive fiber optic receptacle 400, which is connected to the electro-optic module.

Figure 21:
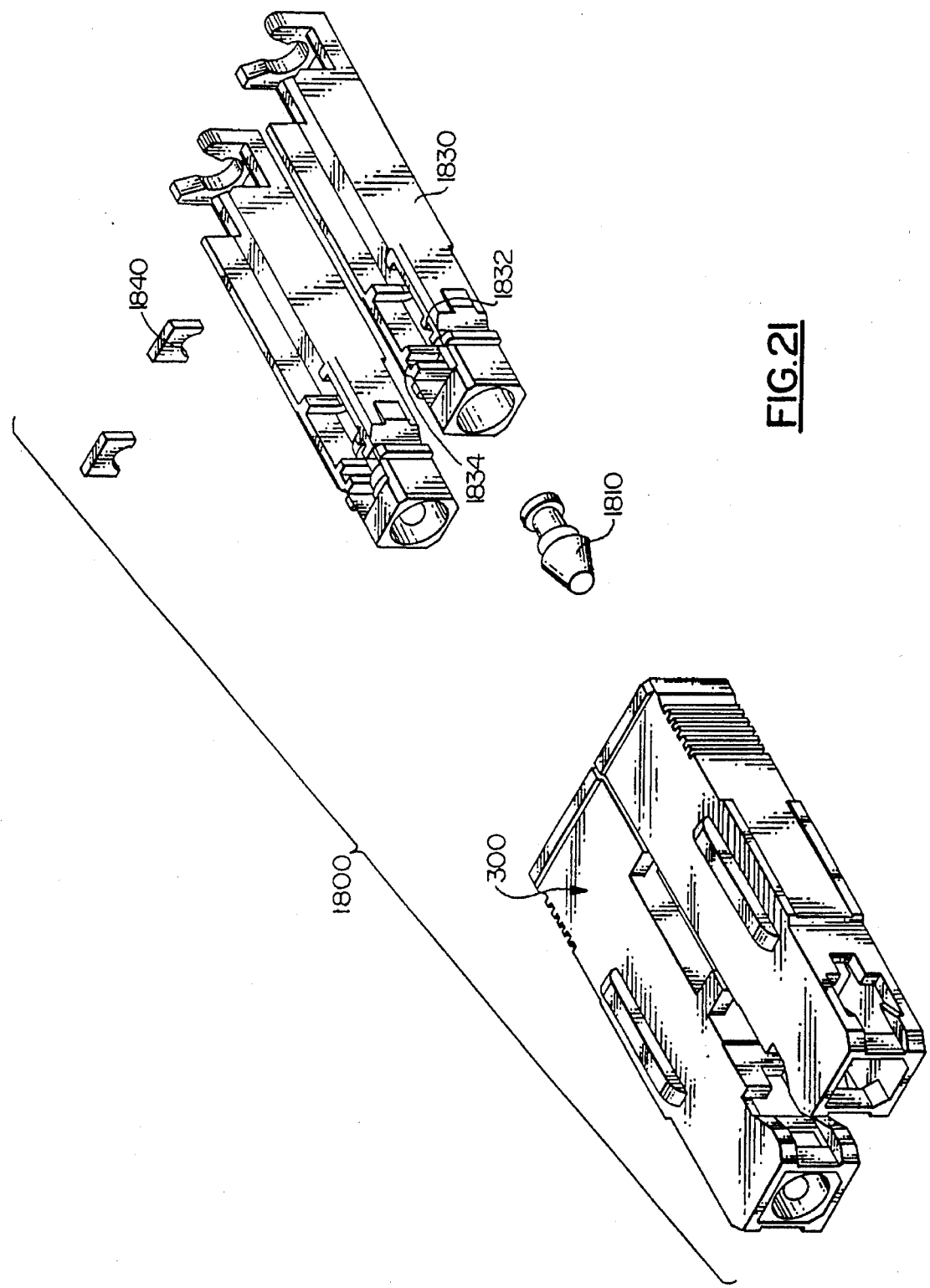

The fourth of the accessory devices, which is a shipping/storage plug for a TOSA or a ROSA of an electro-optic module, is depicted in FIG. 21 and is denoted by the number 1800. As shown, the shipping/storage plug 1800 includes a nipple 1810 which is to be inserted into the front of an essentially conventional plug frame 1830, which is identical to the plug frames 1730, 1630 and 1530, discussed above. The nipple 1810 is maintained in the plug frame 1830 by inserting a keeper 1840 into the internal, aligned notches 1832 and 1834 of the plug frame 1830.

In use, the plug frame 1830, containing the nipple 1810, is inserted into a conventional individual FOCH, which is inserted into a fiber optic receptacle connected to the electro-optic module of interest.

If two plug frames 1830, containing two nipples 1810, are required, then the two plug frames 1830 are preferably inserted into the inventive fiber optic connector housing 300, pictured in FIG. 21.

While the invention has been particularly shown and described with reference to preferred embodiments thereof, it will be understood by those skilled in the art that various changes in form and details may be made therein without departing from the spirit and scope of the invention.

We claim:

1. A device for cleaning at least one optical surface with a fluid, comprising:

at least a first tube through which a fluid is to be injected, and at least a first fluid nozzle, connected to a front end of said first tube;

at least a first plug frame which is adapted to receive, and which contains, said first tube and said first nozzle, the latter protruding through an opening in a front end of said first plug frame;

at least a first fiber optic connector housing which contains said first plug frame, said first nozzle protruding through an opening in a front end of said first fiber optic connector housing;

at least a second tube through which a fluid is to injected, and at least a second fluid nozzle, connected to a front end of said second tube;

at least a second plug frame which is adapted to receive, and which contains, said second tube and said second nozzle, the latter protruding through an opening in a front end of said second plug frame;

at least a second fiber optic connector housing which contains said second plug frame, said second nozzle protruding through an opening in a front end of said second fiber optic connector housing; and means, extending between said first and second fiber optic connector housings, for maintaining said first and second fiber optic connector housings in a substantially side-by-side relationship while permitting each of said first and second fiber optic connector housings to move in at least four different directions relative to the other fiber optic connector housing.

2. The device of claim 1, wherein said at least first and second fiber optic connector housings and said means are of integral construction.

3. A device for brushing or wiping dirt from at least one optical surface, comprising:

at least a first rod, which is either hollow or solid;

at least first brush means for brushing or wiping dirt from an optical surface, which is connected to a front end of said first rod;

at least a first plug frame which is adapted to receive, and which contains, said first rod and said first brush means, the latter protruding through an opening in a front end of said first plug frame; and at least a first fiber optic connector housing which contains said first plug frame, said first brush means protruding through an opening in a front end of said first fiber optic connector housing;

at least a second rod, which is either hollow or solid; at least second brush means for brushing or wiping dirt from an optical surface, which is connected to a front end of said second rod;

at least a second plug frame which is adapted to receive, and which contains, said second rod and second brush means, the latter protruding through an opening in a front end of said second plug frame;

at least a second fiber optic connector housing which contains said second plug frame, said second brush means protruding through an opening in a front end said second fiber optic connector housing; and means, extending between said first and second fiber optic connector housings, for maintaining said first and second fiber optic connector housings in a substantially side-by-side relationship while permitting each of said first and second fiber optic connector housings to move in a least four different directions relative to the other fiber optic connector housing.

4. The device of claim 3, wherein said first rod includes an external shoulder encircling said first rod, said first plug frame includes a shoulder internal to said first plug frame, and said device further comprises a helical spring encircling said first rod, a first end of said helical spring contacting said internal shoulder of said first plug frame and a second end of said helical spring contacting said external shoulder of said first rod.

5. The device of claim 3, wherein said at least first and second fiber optic connector housings and said means are of integral construction.

6. A device for communicating light emitted by a first optical subassembly, which includes a first transducer for converting electrical signals to optical signals, to a second optical subassembly, which includes a second transducer for converting optical signals to electrical signals, comprising:

an optical fiber and first and second ferrules, a first end of said optical fiber being contained in said first ferrule and a second end of said optical fiber being contained in said second ferrule;

a first plug frame, which is adapted to receive, and which contains, said first ferrule and a first portion of said optical fiber, and a second plug frame, which is adapted to receive, and which contains, said second ferrule and a second portion of said optical fiber, a third portion of said optical fiber extending from said first plug frame to said second plug frame; and a first fiber optic connector housing, which contains said first plug frame, and a second fiber optic connector housing, which contains said second plug frame;

further comprising means, extending between said first and second fiber optic connector housing, for maintaining said first and second fiber optic connector housings in a substantially side-by side relationship while permitting each of said and second fiber optic connector housings to move in at least four different directions relative to the other fiber optic connector housing.

7. The device of claim 6, wherein said first and second fiber optic connector housings and said means are of integral construction.

8. The device of claim 6, wherein said first ferrule includes an external shoulder encircling said first ferrule, said first plug frame includes a shoulder internal to said first plug frame, and said device further comprises a first helical spring encircling said optical fiber, a first end of said first helical spring contacting said internal shoulder of said first plug frame and a second end of said first helical spring contacting said external shoulder of said first ferrule.

9. The device of claim 8, wherein said second ferrule includes an external shoulder encircling said second ferrule, said second plug frame includes a shoulder internal to said second plug frame, and said device further comprises a second helical spring encircling said optical fiber, a first end of said helical spring contacting said internal shoulder of said second plug frame and a second end of said second helical spring contacting said external shoulder of said second ferrule.

10. A shipping/storage plug for an optical assembly which includes at least a first optical subassembly, comprising:

at least a first nipple, which is adapted for at least partial insertion into a bore of a first optical subassembly;

at least a first plug frame, which is adapted to receive, and which contains, said first nipple; and at least a first fiber optic connector housing, which contains said first plug frame;

at least a second nipple, which is adapted for at least partial insertion into a bore of a second optical subassembly;

at least a second plug frame, which is adapted to receive, and which contains, said second nipple;

at least a second fiber optic connector housing, which contains said second plug frame; and means, extending between said first and second fiber optic connector housings, for maintaining said first and second fiber optic connector housings in a substantially side-by-side relationship while permitting each of said first and second fiber optic connector housings to move in at least four different directions relative to the other fiber optic connector housing.

11. The shipping/storage plug of claim 10, wherein said first and second fiber optic connector housings and said means are of integral construction.

* * * * *